US012633133B2

(12) United States Patent
Nakayama

(10) Patent No.: US 12,633,133 B2
(45) Date of Patent: May 19, 2026

(54) RECOGNITION PROCESSING DEVICE, RECOGNITION PROCESSING METHOD, AND RECOGNITION PROCESSING SYSTEM

(71) Applicant: SONY SEMICONDUCTOR SOLUTIONS CORPORATION, Kanagawa (JP)

(72) Inventor: Satoshi Nakayama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 190 days.

(21) Appl. No.: 18/693,718

(22) PCT Filed: Sep. 21, 2022

(86) PCT No.: PCT/JP2022/035093
§ 371 (c)(1),
(2) Date: Mar. 20, 2024

(87) PCT Pub. No.: WO2023/054090
PCT Pub. Date: Apr. 6, 2023

(65) Prior Publication Data
US 2024/0386724 A1 Nov. 21, 2024

(30) Foreign Application Priority Data
Oct. 1, 2021 (JP) ................................. 2021-162501

(51) Int. Cl.
*G06V 20/58* (2022.01)
(52) U.S. Cl.
CPC .......... *G06V 20/58* (2022.01); *G06V 2201/07* (2022.01)
(58) Field of Classification Search
None
See application file for complete search history.

(56) References Cited

U.S. PATENT DOCUMENTS

2015/0269448 A1* 9/2015 Kosaki ................... G06V 20/58
382/103
2015/0269449 A1* 9/2015 Kosaki ................... G06F 18/28
382/103

(Continued)

FOREIGN PATENT DOCUMENTS

CA 2975139 A1 * 3/2018 ........... H04N 13/239
CA 2988303 C * 11/2018 ........... G06V 20/584

(Continued)

OTHER PUBLICATIONS

International Search Report and Written Opinion of PCT Application No. PCT/JP2022/035093, issued on Oct. 25, 2022, 09 pages of ISRWO.

*Primary Examiner* — Ricky Chin
(74) *Attorney, Agent, or Firm* — CHIP LAW GROUP

(57) ABSTRACT

The present technology relates to a recognition processing device, a recognition processing method, and a recognition processing system capable of realizing more efficient object recognition.

The dictionary data storage unit stores a far dictionary for each pattern to be recognized and a nearby dictionary for each pattern, and the recognition processing unit executes recognition processing of recognizing an object included in a wide-angle image captured by a wide-angle camera using the far dictionary and the nearby dictionary. Further, the recognition processing unit recognizes the object by using a plurality of patterns of the far dictionaries and a nearby dictionary of the same pattern as the far dictionary of a high likelihood pattern in which the object is recognized with high likelihood among the far dictionaries. The present technology can be applied to, for example, an image recognition chip that performs pedestrian recognition on a wide-angle image.

15 Claims, 20 Drawing Sheets

(56) References Cited

U.S. PATENT DOCUMENTS

| | | | | |
|---|---|---|---|---|
| 2016/0086333 A1 * | 3/2016 | Scholl | ....................... | B60R 1/27 |
| | | | | 701/300 |
| 2021/0136292 A1 * | 5/2021 | Hoch | .................... | H04N 23/61 |
| 2021/0192680 A1 * | 6/2021 | Masuda | ............... | G06V 10/243 |
| 2023/0077082 A1 * | 3/2023 | Liu | ................... | G01C 21/3837 |
| 2024/0386724 A1 * | 11/2024 | Nakayama | ............. | G06V 10/75 |

FOREIGN PATENT DOCUMENTS

| | | | | | | |
|---|---|---|---|---|---|---|
| CA | 3035710 | A1 | * | 9/2019 | .......... | G06V 10/774 |
| CA | 3149005 | A1 | * | 8/2022 | ............ | G06V 20/52 |
| CN | 104954664 | A | * | 9/2015 | ............ | G06V 20/58 |
| CN | 108734697 | A | * | 11/2018 | ............ | G06T 7/593 |
| CN | 110443142 | A | * | 11/2019 | .......... | G06T 7/0002 |
| CN | 110458137 | A | * | 11/2019 | ........ | G06F 18/2135 |
| CN | 106952308 | B | * | 2/2020 | ............ | G06V 20/58 |
| CN | 111814720 | A | * | 10/2020 | ............ | G06N 3/045 |
| CN | 112069980 | A | * | 12/2020 | ............ | G06V 20/58 |
| JP | 2009-009209 | A | | 1/2009 | | |
| JP | 2014-092975 | A | | 5/2014 | | |
| JP | 2015184908 | A | * | 10/2015 | ............ | G06V 20/58 |
| JP | 2017-044530 | A | | 3/2017 | | |
| JP | 2020-027380 | A | | 2/2020 | | |
| KR | 20230174730 | A | * | 12/2003 | .......... | G01S 15/931 |
| KR | 101481648 | B1 | * | 1/2015 | ............ | G06V 10/10 |
| WO | WO-2018203512 | A1 | * | 11/2018 | ............ | G06V 40/16 |
| WO | WO-2019102938 | A1 | * | 5/2019 | ............ | B60W 30/14 |
| WO | WO-2022215409 | A1 | * | 10/2022 | ............ | G06T 7/246 |
| WO | WO-2022230413 | A1 | * | 11/2022 | ............ | G06V 10/82 |

* cited by examiner

| DICTIONARY PATTERN | ADULT (THIN) | ADULT (THICK) | CHILD (THIN) | CHILD (THICK) |
|---|---|---|---|---|
| FAR DICTIONARY A | DICTIONARY A-1 | DICTIONARY A-2 | DICTIONARY A-3 | DICTIONARY A-4 |
| NEARBY DICTIONARY B | DICTIONARY B-1 | DICTIONARY B-2 | DICTIONARY B-3 | DICTIONARY B-4 |

FIG. 7

| DICTIONARY PATTERN | GENERAL-PURPOSE | ADULT (THIN) | ADULT (THICK) | CHILD (THIN) | CHILD (THICK) |
|---|---|---|---|---|---|
| FAR DICTIONARY A | DICTIONARY A-0 | DICTIONARY A-1 | DICTIONARY A-2 | DICTIONARY A-3 | DICTIONARY A-4 |
| NEARBY DICTIONARY B | DICTIONARY B-0 | DICTIONARY B-1 | DICTIONARY B-2 | DICTIONARY B-3 | DICTIONARY B-4 |

FIG. 14

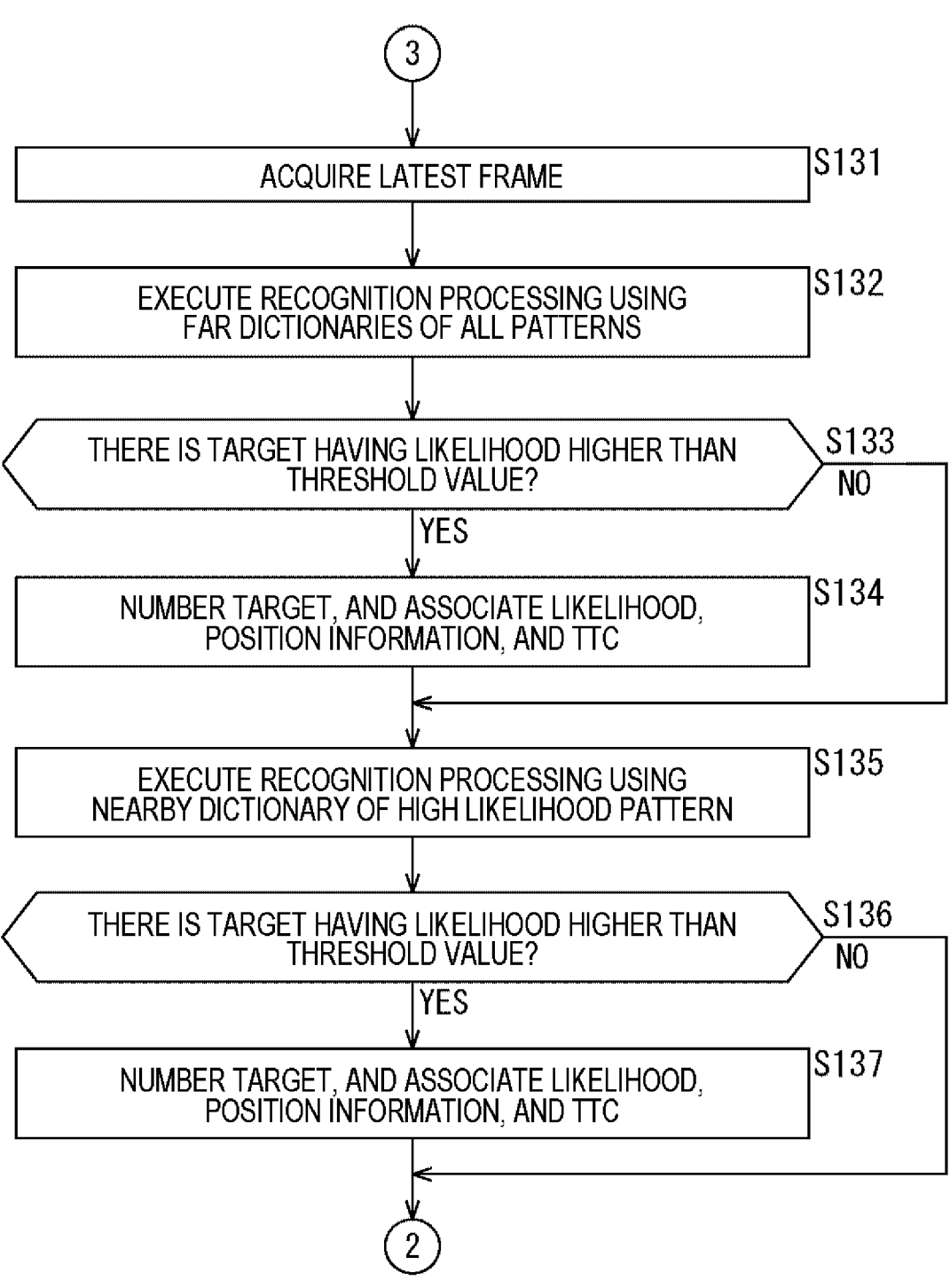

(3)

ACQUIRE LATEST FRAME — S131

EXECUTE RECOGNITION PROCESSING USING FAR DICTIONARIES OF ALL PATTERNS — S132

THERE IS TARGET HAVING LIKELIHOOD HIGHER THAN THRESHOLD VALUE? — S133

NO

YES

NUMBER TARGET, AND ASSOCIATE LIKELIHOOD, POSITION INFORMATION, AND TTC — S134

EXECUTE RECOGNITION PROCESSING USING NEARBY DICTIONARY OF HIGH LIKELIHOOD PATTERN — S135

THERE IS TARGET HAVING LIKELIHOOD HIGHER THAN THRESHOLD VALUE? — S136

NO

YES

NUMBER TARGET, AND ASSOCIATE LIKELIHOOD, POSITION INFORMATION, AND TTC — S137

| DICTIONARY PATTERN | GENERAL-PURPOSE 0 | GENERAL-PURPOSE 1 | GENERAL-PURPOSE 2 | GENERAL-PURPOSE 3 | GENERAL-PURPOSE 4 |
|---|---|---|---|---|---|
| FAR DICTIONARY A | DICTIONARY A-0 | DICTIONARY A-1 | DICTIONARY A-2 | DICTIONARY A-3 | DICTIONARY A-4 |
| NEARBY DICTIONARY B | DICTIONARY B-0 | DICTIONARY B-1 | DICTIONARY B-2 | DICTIONARY B-3 | DICTIONARY B-4 |

RECOGNITION PROCESSING DEVICE, RECOGNITION PROCESSING METHOD, AND RECOGNITION PROCESSING SYSTEM

CROSS REFERENCE TO RELATED APPLICATIONS

This application is a U.S. National Phase of International Patent Application No. PCT/JP2022/035093 filed on Sep. 21, 2022, which claims priority benefit of Japanese Patent Application No. JP 2021-162501 filed in the Japan Patent Office on Oct. 1, 2021. Each of the above-referenced applications is hereby incorporated herein by reference in its entirety.

TECHNICAL FIELD

The present technology relates to a recognition processing device, a recognition processing method, and a recognition processing system, and more particularly, to a recognition processing device, a recognition processing method, and a recognition processing system capable of realizing more efficient object recognition.

BACKGROUND ART

Patent Document 1 discloses a recognition processing device that detects a person by preferentially executing person recognition for the vicinity of another vehicle when heat radiation from another vehicle parked or stopped around a host vehicle is detected in an infrared image.

Meanwhile, in a case where object recognition is performed on a wide-angle image captured by a wide-angle camera, it is known to perform distortion correction processing called cylindrical correction.

CITATION LIST

Patent Document

Patent Document 1: Japanese Patent Application Laid-Open No. 2020-27380

SUMMARY OF THE INVENTION

Problems to be Solved by the Invention

In the cylindrically corrected wide-angle image, the appearance greatly differs between the case where the recognition target is located far away and the case where the recognition target is located in the vicinity, which hinders efficient object recognition for the wide-angle image.

The present technology has been made in view of such a situation, and aims to realize more efficient object recognition.

Solutions to Problems

A recognition processing device of the present technology includes: a dictionary data storage unit that stores a far dictionary for each pattern of a recognition target and a nearby dictionary for each pattern; and a recognition processing unit that executes recognition processing of recognizing an object included in a wide-angle image captured by a wide-angle camera by using the far dictionary and the nearby dictionary, in which the recognition processing unit recognizes the object by using a plurality of patterns of the far dictionaries and the nearby dictionary of the same pattern as the far dictionary of a high likelihood pattern in which the object is recognized with high likelihood among the far dictionaries.

A recognition processing method of the present technology includes recognizing, by a recognition processing device that executes recognition processing of recognizing an object included in a wide-angle image captured by a wide-angle camera using a far dictionary for each pattern to be recognized and a nearby dictionary for each pattern, the object by using the far dictionaries of a plurality of patterns and the nearby dictionary of the same pattern as the far dictionary of a high likelihood pattern in which the object is recognized with high likelihood among the far dictionaries.

A recognition processing system of the present technology includes: a wide-angle camera; and a recognition processing device that stores a far dictionary for each pattern to be recognized and a nearby dictionary for each pattern, and executes recognition processing of recognizing an object included in a wide-angle image captured by the wide-angle camera using the far dictionary and the nearby dictionary, in which the recognition processing device recognizes the object by using a plurality of patterns of the far dictionaries and the nearby dictionary of the same pattern as the far dictionary of a high likelihood pattern in which the object is recognized with high likelihood among the far dictionaries.

In the present technology, recognition processing of recognizing an object included in a wide-angle image captured by a wide-angle camera using a far dictionary for each pattern to be recognized and a nearby dictionary for each pattern is executed, and the object is recognized by using the far dictionaries of a plurality of patterns and the nearby dictionary of the same pattern as the far dictionary of a high likelihood pattern in which the object is recognized with high likelihood among the far dictionaries.

BRIEF DESCRIPTION OF DRAWINGS

FIG. 2 is a diagram illustrating examples of sensing areas.

FIG. 4 is a diagram illustrating examples of patterns of recognition dictionaries.

FIG. 7 is a diagram illustrating examples of patterns of recognition dictionaries according to the present technology.

FIG. 14 is a flowchart illustrating details of recognition processing of the present technology.

FIG. 19 is a diagram illustrating another example of a pattern of a recognition dictionary according to the present technology.

MODE FOR CARRYING OUT THE INVENTION

Figure 1:
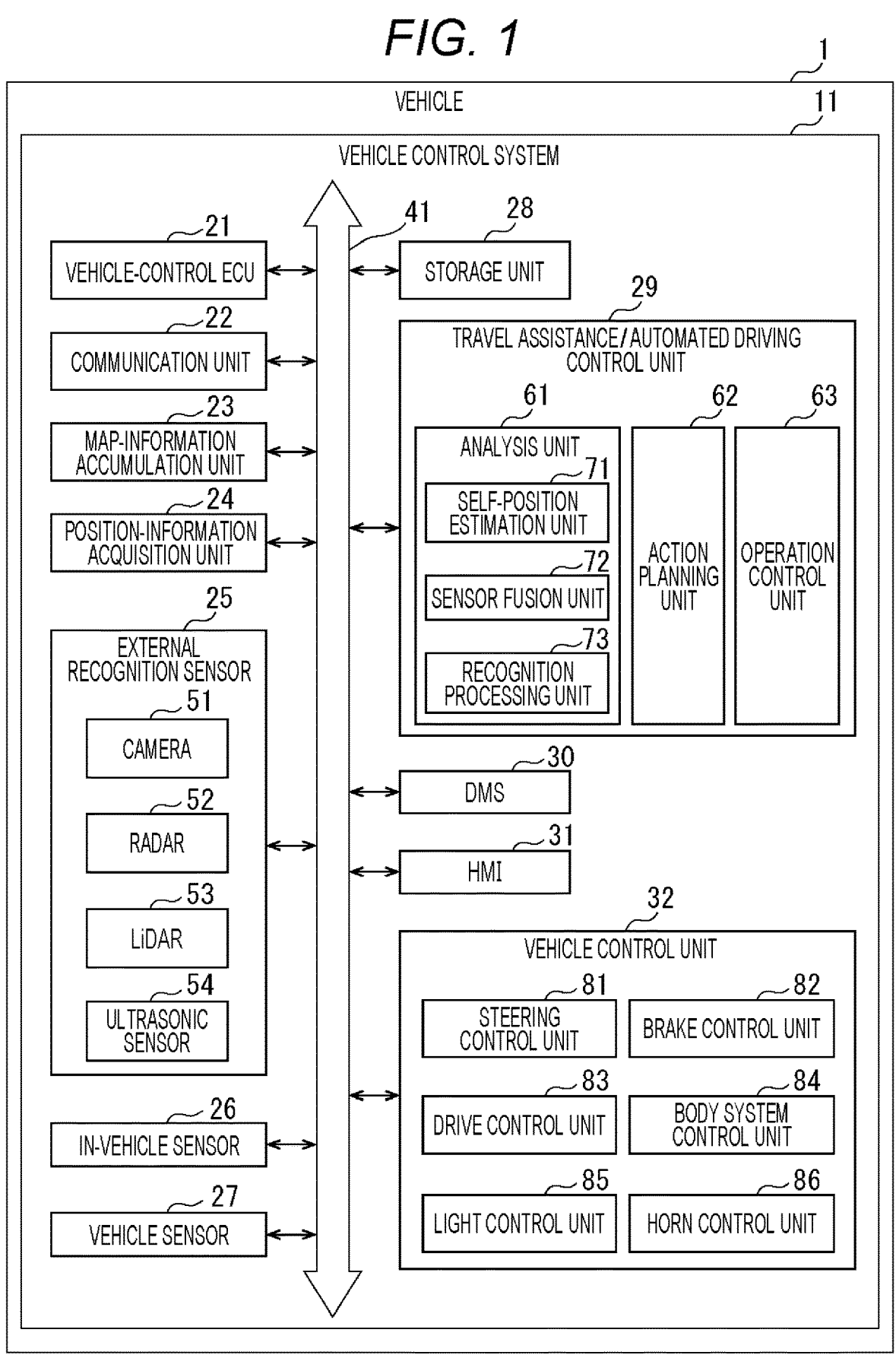
FIG. 1 is a block diagram illustrating a configuration example of a vehicle control system.

Modes for carrying out the present technology (hereinafter referred to as embodiments) will be described below. Note that, the description will be given in the following order.

1. Configuration example of vehicle control system
2. Problems of conventional recognition processing
3. Configuration and outline of operation of recognition processing system of present technology
4. Details of recognition processing of present technology
5. Modifications
6. Configuration example of computer

1. Configuration Example of Vehicle Control System

FIG. 1 is a block diagram illustrating a configuration example of a vehicle control system 11 that is an example of a mobile device control system to which the present technology is applied.

The vehicle control system 11 is provided in a vehicle 1 and executes processing related to travel assistance and automated driving of the vehicle 1.

The vehicle control system 11 includes a vehicle-control electronic control unit (ECU) 21, a communication unit 22, a map-information accumulation unit 23, a position-information acquisition unit 24, an external recognition sensor 25, an in-vehicle sensor 26, a vehicle sensor 27, a storage unit 28, a travel assistance/automated driving control unit 29, a driver monitoring system (DMS) 30, a human machine interface (HMI) 31, and a vehicle control unit 32.

The vehicle control ECU 21, the communication unit 22, the map-information accumulation unit 23, the position-information acquisition unit 24, the external recognition sensor 25, the in-vehicle sensor 26, the vehicle sensor 27, the storage unit 28, the travel assistance/automated driving control unit 29, the driver monitoring system (DMS) 30, the human machine interface (HMI) 31, and the vehicle control unit 32 are communicably connected to each other via a communication network 41. The communication network 41 includes, for example, an in-vehicle communication network, a bus, or the like that conforms to a digital bidirectional communication standard such as a controller area network (CAN), a local interconnect network (LIN), a local area network (LAN), FlexRay (registered trademark), or Ethernet (registered trademark). The communication network 41 may be selectively used depending on the type of data to be transmitted. For example, the CAN may be applied to data related to vehicle control, and the Ethernet may be applied to large-volume data. Note that, units of the vehicle control system 11 may be directly connected to each other using wireless communication adapted to a relatively short-range communication, such as near field communication (NFC) or Bluetooth (registered trademark) without using the communication network 41.

Note that, hereinafter, in a case where each unit of the vehicle control system 11 performs communication via the communication network 41, the description of the communication network 41 will be omitted. For example, in a case where the vehicle control ECU 21 and the communication unit 22 perform communication via the communication network 41, it will be simply described that the vehicle control ECU 21 and the communication unit 22 perform communication.

For example, the vehicle control ECU 21 includes various processors such as a central processing unit (CPU) and a micro processing unit (MPU). The vehicle control ECU 21 controls all or some of the functions of the vehicle control system 11.

The communication unit 22 communicates with various devices inside and outside the vehicle, another vehicle, a server, a base station, and the like, and transmits and receives various types of data. At this time, the communication unit 22 can perform communication using a plurality of communication schemes.

Communication with the outside of the vehicle executable by the communication unit 22 will be schematically described. The communication unit 22 communicates with a server (hereinafter, referred to as an external server) or the like present on an external network via a base station or an access point by, for example, a wireless communication scheme such as fifth generation mobile communication system (5G), long term evolution (LTE), dedicated short range communications (DSRC), or the like. Examples of the external network with which the communication unit 22 performs communication include the Internet, a cloud network, a company-specific network, and the like. The communication scheme by which the communication unit 22 communicates with the external network is not particularly limited as long as it is a wireless communication scheme allowing digital bidirectional communication at a communication speed equal to or higher than a predetermined speed and over a distance equal to or longer than a predetermined distance.

Furthermore, for example, the communication unit 22 can communicate with a terminal present in the vicinity of a host vehicle using a peer to peer (P2P) technology. The terminal present in the vicinity of the host vehicle is, for example, a terminal attached to a moving body moving at a relatively low speed such as a pedestrian or a bicycle, a terminal fixedly installed in a store or the like, or a machine type communication (MTC) terminal. Moreover, the communication unit 22 can also perform V2X communication. The V2X communication refers to, for example, communication between the host vehicle and another vehicle, such as vehicle to vehicle communication with another vehicle, vehicle to infrastructure communication with a roadside device or the like, vehicle to home communication, and vehicle to pedestrian communication with a terminal or the like carried by a pedestrian.

For example, the communication unit 22 can receive a program for updating software for controlling the operation of the vehicle control system 11 from the outside (Over The Air). The communication unit 22 can further receive map information, traffic information, information regarding the surroundings of the vehicle 1, and the like from the outside. Furthermore, for example, the communication unit 22 can transmit information regarding the vehicle 1, information regarding the surroundings of the vehicle 1, and the like to the outside. Examples of the information regarding the vehicle 1 transmitted to the outside by the communication unit 22 include data indicating the state of the vehicle 1, a recognition result by the recognition processing unit 73, and the like. Moreover, for example, the communication unit 22 performs communication corresponding to a vehicle emergency call system such as an eCall.

For example, the communication unit 22 receives an electromagnetic wave transmitted by a road traffic information communication system (vehicle information and communication system (VICS) (registered trademark)), such as a radio wave beacon, an optical beacon, or FM multiplex broadcasting.

Communication with the inside of the vehicle executable by the communication unit 22 will be schematically described. The communication unit 22 can communicate with each device in the vehicle using, for example, wireless communication. The communication unit 22 can perform wireless communication with a device in the vehicle by, for example, a communication scheme allowing digital bidirectional communication at a communication speed equal to or higher than a predetermined speed by wireless communication, such as wireless LAN, Bluetooth, NFC, or wireless USB (WUSB). Communication performed by the communication unit 22 is not limited to wireless communication, and the communication unit 22 can also communicate with each device in the vehicle using wired communication. For example, the communication unit 22 can communicate with each device in the vehicle by wired communication via a cable connected to a connection terminal (not illustrated). The communication unit 22 can communicate with each device in the vehicle by a communication scheme allowing digital bidirectional communication at a communication speed equal to or higher than a predetermined speed by wired communication, such as universal serial bus (USB), high-definition multimedia interface (HDMI) (registered trademark), or mobile high-definition link (MHL).

Here, the device in the vehicle refers to, for example, a device that is not connected to the communication network 41 in the vehicle. As the in-vehicle device, for example, a mobile apparatus or a wearable device carried by an occupant such as a driver, an information device carried onto a vehicle and temporarily installed, or the like can be considered.

The map-information accumulation unit 23 accumulates one or both of a map acquired from the outside and a map created by the vehicle 1. For example, the map-information accumulation unit 23 accumulates a three-dimensional high-precision map, a global map that is lower in precision than the high-precision map but covers a wider area, and the like.

The high-precision map is, for example, a dynamic map, a point cloud map, a vector map, or the like. The dynamic map is, for example, a map including four layers of dynamic information, semi-dynamic information, semi-static information, and static information, and is provided to the vehicle 1 from the external server or the like. The point cloud map is a map including point clouds (point cloud data). The vector map is, for example, a map in which traffic information such as a lane and a position of a traffic light is associated with a point cloud map and adapted to an advanced driver assistance system (ADAS) or autonomous driving (AD).

The point cloud map and the vector map may be provided from, for example, the external server or the like, or may be created by the vehicle 1 as a map for performing matching with a local map to be described later on the basis of a sensing result from a camera 51, a radar 52, a light detection and ranging or laser imaging detection and ranging (LiDAR) 53, or the like, and may be accumulated in the map-information accumulation unit 23. Furthermore, in a case where the high-precision map is provided from the external server or the like, for example, map data of several hundred meters square regarding a planned path on which the vehicle 1 travels from now is acquired from the external server or the like in order to reduce the communication traffic.

The position-information acquisition unit 24 receives a global navigation satellite system (GNSS) signal from a GNSS satellite, and acquires position information of the vehicle 1. The acquired position information is supplied to the travel assistance/automated driving control unit 29. Note that, the position-information acquisition unit 24 may acquire the position information using not only a method using the GNSS signal, but also, for example, a beacon.

The external recognition sensor 25 includes various sensors used for recognizing a situation outside the vehicle 1, and supplies sensor data from each sensor to each unit of the vehicle control system 11. The type and number of sensors included in the external recognition sensor 25 may be determined as desired.

For example, the external recognition sensor 25 includes the camera 51, the radar 52, the light detection and ranging, the laser imaging detection and ranging (LiDAR) 53, and an ultrasonic sensor 54. Without being limited to this, and the external recognition sensor 25 may include one or more types of sensors among the camera 51, the radar 52, the LiDAR 53, and the ultrasonic sensor 54. The numbers of the cameras 51, the radars 52, the LiDARs 53, and the ultrasonic sensors 54 are not particularly limited as long as they can be provided in the vehicle 1. Furthermore, the types of sensors included in the external recognition sensor 25 are not limited to this example, and the external recognition sensor 25 may include other type of sensors. An example of a sensing area of each sensor included in the external recognition sensor 25 will be described later.

Note that an imaging method of the camera 51 is not particularly limited. For example, cameras of various imaging methods such as a time-of-flight (ToF) camera, a stereo camera, a monocular camera, and an infrared camera, which are imaging methods capable of distance measurement, can be applied to the camera 51 as necessary. It is not limited thereto, and the camera 51 may simply acquire a captured image regardless of distance measurement.

Furthermore, for example, the external recognition sensor 25 can include an environment sensor for detecting the environment for the vehicle 1. The environment sensor is a sensor for detecting an environment such as weather, climate, and brightness, and can include various sensors such as a raindrop sensor, a fog sensor, a sunshine sensor, a snow sensor, and an illuminance sensor, for example.

Moreover, for example, the external recognition sensor 25 includes a microphone used for detecting a sound around the vehicle 1, a position of a sound source, and the like.

The in-vehicle sensor 26 includes various sensors for detecting information regarding the inside of the vehicle, and supplies sensor data from each sensor to each unit of the vehicle control system 11. The types and number of various sensors included in the in-vehicle sensor 26 are not particularly limited as long as they can be practically installed in the vehicle 1.

For example, the in-vehicle sensor 26 can include one or more sensors of a camera, a radar, a seating sensor, a steering wheel sensor, a microphone, and a biological sensor. As the camera included in the in-vehicle sensor 26, for example, cameras of various imaging methods capable of measuring a distance, such as a ToF camera, a stereo camera, a monocular camera, and an infrared camera, can be used. In addition thereto, the camera included in the in-vehicle sensor 26 may be one that simply acquires a captured image without regard to ranging. The biosensor included in the in-vehicle sensor 26 is provided, for example, on a seat, a steering wheel, or the like, and detects various kinds of biological information about an occupant such as a driver.

The vehicle sensor 27 includes various sensors for detecting the state of the vehicle 1, and supplies sensor data from each sensor to each unit of the vehicle control system 11. The types and number of various sensors included in the vehicle sensor 27 are not particularly limited as long as they can be practically installed in the vehicle 1.

For example, the vehicle sensor 27 includes a speed sensor, an acceleration sensor, an angular velocity sensor (gyro sensor), and an inertial measurement unit (IMU) in which these sensors are integrated. For example, the vehicle sensor 27 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects the number of rotations of an engine or a motor, an air pressure sensor that detects an air pressure of a tire, a slip rate sensor that detects a slip rate of the tire, and a wheel speed sensor that detects a rotation speed of a wheel. For example, the vehicle sensor 27 includes a battery sensor that detects the state of charge and temperature of a battery, and an impact sensor that detects an external impact.

The storage unit 28 includes at least one of a non-volatile storage medium or a volatile storage medium, and stores data and a program. The storage unit 28 is used as, for example, an electrically erasable programmable read only memory (EEPROM) and a random access memory (RAM), and a magnetic storage device such as a hard disc drive (HDD), a semiconductor storage device, an optical storage device, and a magneto-optical storage device can be applied as the storage medium. The storage unit 28 stores therein various programs and data used by each unit of the vehicle control system 11. For example, the storage unit 28 includes an event data recorder (EDR) and a data storage system for automated driving (DSSAD), and stores therein information about the vehicle 1 before and after an event such as an accident and information acquired by the in-vehicle sensor 26.

The travel assistance/automated driving control unit 29 controls travel assistance and automated driving of the vehicle 1. For example, the travel assistance/automated driving control unit 29 includes an analysis unit 61, an action planning unit 62, and an operation control unit 63.

The analysis unit 61 executes analysis processing on the vehicle 1 and a situation around the vehicle 1. The analysis unit 61 includes a self-position estimation unit 71, a sensor fusion unit 72, and the recognition processing unit 73.

The self-position estimation unit 71 estimates a self-position of the vehicle 1, on the basis of the sensor data from the external recognition sensor 25 and the high-precision map accumulated in the map-information accumulation unit 23. For example, the self-position estimation unit 71 generates a local map on the basis of the sensor data from the external recognition sensor 25, and estimates the self-position of the vehicle 1 by matching the local map with the high-precision map. The position of the vehicle 1 is based on, for example, a center of a rear wheel pair axle.

The local map is, for example, a three-dimensional high-precision map created using a technology such as simultaneous localization and mapping (SLAM), or the like, an occupancy grid map, or the like. The three-dimensional high-precision map is, for example, the above-described point cloud map or the like. The occupancy grid map is a map in which a three-dimensional or two-dimensional space around the vehicle 1 is divided into grids (lattices) of a predetermined size, and an occupancy state of an object is represented in units of grids. The occupancy state of the object is represented by, for example, presence or absence or an existence probability of the object. The local map is also used for detection processing and recognition processing of a situation outside the vehicle 1 by the recognition processing unit 73, for example.

Note that, the self-position estimation unit 71 may estimate the self-position of the vehicle 1 on the basis of the position information acquired by the position-information acquisition unit 24 and the sensor data from the vehicle sensor 27.

The sensor fusion unit 72 executes sensor fusion processing for combining a plurality of different types of sensor data (for example, image data supplied from camera 51 and sensor data supplied from radar 52), to acquire new information. Methods for combining different types of sensor data include integration, fusion, association, or the like.

The recognition processing unit 73 executes detection processing for detecting the situation outside the vehicle 1 and recognition processing for recognizing the situation outside the vehicle 1.

For example, the recognition processing unit 73 executes the detection processing and the recognition processing on the situation outside the vehicle 1, on the basis of the information from the external recognition sensor 25, the information from the self-position estimation unit 71, the information from the sensor fusion unit 72, or the like.

Specifically, for example, the recognition processing unit 73 executes the detection processing, the recognition processing, or the like on the object around the vehicle 1. The object detection processing is, for example, processing for detecting presence or absence, size, shape, position, motion, or the like of an object. The object recognition processing is, for example, processing for recognizing an attribute such as a type of an object or identifying a specific object. The detection processing and the recognition processing, however, are not necessarily clearly separated and may overlap.

For example, the recognition processing unit 73 detects an object around the vehicle 1 by performing clustering to classify point clouds based on sensor data from the radar 52, the LiDAR 53, or the like into clusters of point clouds. Thus, the presence or absence, size, shape, and position of the object around the vehicle 1 are detected.

For example, the recognition processing unit 73 detects a motion of the object around the vehicle 1 by performing tracking for following a motion of the cluster of the point cloud classified by clustering. As a result, a speed and a traveling direction (movement vector) of the object around the vehicle 1 are detected.

For example, the recognition processing unit 73 detects or recognizes a vehicle, a person, a bicycle, an obstacle, a structure, a road, a traffic light, a traffic sign, a road sign, and the like on the basis of the image data supplied from the camera 51. Furthermore, the recognition processing unit 73 may recognize the type of the object around the vehicle 1 by executing recognition processing such as semantic segmentation.

For example, the recognition processing unit 73 can execute processing for recognizing traffic rules around the vehicle 1 on the basis of the map accumulated in the map-information accumulation unit 23, the estimation result of the self-position by the self-position estimation unit 71, and the recognition result of the object around the vehicle 1 by the recognition processing unit 73. Through this processing, the recognition processing unit 73 can recognize a position and a state of a traffic light, contents of a traffic sign and a road sign, contents of traffic regulation, a travelable lane, and the like.

For example, the recognition processing unit 73 can execute the recognition processing on a surrounding environment of the vehicle 1. As the surrounding environment to be recognized by the recognition processing unit 73, a weather, a temperature, a humidity, brightness, a road surface condition, or the like are assumed.

The action planning unit 62 creates an action plan for the vehicle 1. For example, the action planning unit 62 creates an action plan by executing processing of path planning and path following.

Note that, global path planning (global path planning) is processing for planning a rough path from a start to a goal. The path planning includes processing of performing track generation (local path planning) called a track planning that enables safe and smooth traveling in the vicinity of the vehicle 1 in consideration of the motion characteristics of the vehicle 1 in the planned path.

The path following is processing of planning an operation for safely and accurately traveling a path planned by the path planning within a planned time. For example, the action planning unit 62 can calculate the target speed and the target angular velocity of the vehicle 1 on the basis of a result of the path following processing.

The operation control unit 63 controls the operation of the vehicle 1 in order to achieve the action plan created by the action planning unit 62.

For example, the operation control unit 63 controls a steering control unit 81, a brake control unit 82, and a drive control unit 83 included in the vehicle control unit 32 to be described later, to control acceleration/deceleration and the direction so that the vehicle 1 travels on a track calculated by the track planning. For example, the operation control unit 63 performs coordinated control for the purpose of implementing the functions of the ADAS such as collision avoidance or impact mitigation, follow-up traveling, vehicle-speed maintaining traveling, warning of collision of a host vehicle, warning of lane deviation of a host vehicle, and the like. For example, the operation control unit 63 performs coordinated control for the purpose of automated driving or the like in which a vehicle autonomously travels without depending on the operation of a driver.

The DMS 30 executes authentication processing on the driver, recognition processing on a state of the driver, or the like, on the basis of the sensor data from the in-vehicle sensor 26, the input data input to the HMI 31 to be described later, or the like. As the state of the driver to be recognized, for example, a physical condition, an alertness level, a concentration level, a fatigue level, a line-of-sight direction, a drunkenness level, a driving operation, a posture, and the like are assumed.

Note that, the DMS 30 may execute processing for authenticating an occupant other than the driver, and recognition processing on a state of the occupant. Furthermore, for example, the DMS 30 may execute recognition processing on the conditions inside the vehicle on the basis of sensor data from the in-vehicle sensor 26. As the conditions inside the vehicle to be recognized, for example, temperature, humidity, brightness, odor, and the like are assumed.

The HMI 31 receives various data, instructions, and the like, and presents various data to a driver and the like.

The input of data through the HMI 31 will be schematically described. The HMI 31 includes an input device for a person to input data. The HMI 31 generates an input signal on the basis of data, an instruction, or the like input by the input device, and supplies the input signal to each unit of the vehicle control system 11. The HMI 31 includes, for example, an operator such as a touch panel, a button, a switch, or a lever as the input device. It is not limited thereto, and the HMI 31 may further include an input device capable of inputting information by a method such as voice, gesture, or the like other than manual operation. Moreover, the HMI 31 may use, for example, a remote control device using infrared rays or radio waves, or an external connection device such as a mobile device or a wearable device adapted to the operation of the vehicle control system 11 as an input device.

Presentation of data by the HMI 31 will be schematically described. The HMI 31 generates visual information, auditory information, and haptic information regarding an occupant or outside of a vehicle. Furthermore, the HMI 31 performs output control for controlling the output, output content, output timing, output method, and the like of each piece of generated information. The HMI 31 generates and outputs, for example, an operation screen, a state display of the vehicle 1, a warning display, an image such as a monitor image indicating a situation around the vehicle 1, and information indicated by light as the visual information. Furthermore, the HMI 31 generates and outputs information indicated by sounds such as voice guidance, a warning sound, and a warning message, for example, as the auditory information. Moreover, the HMI 31 generates and outputs, as the haptic information, information given to the tactile sense of an occupant by, for example, force, vibration, motion, or the like.

As an output device that the HMI 31 outputs the visual information, for example, a display device that presents the visual information by displaying an image by itself or a projector device that presents the visual information by projecting an image can be applied. Note that, the display device may be a device that displays visual information in the field of view of an occupant, such as a head-up display, a transmissive display, or a wearable device having an augmented reality (AR) function, for example, in addition to a display device having an ordinary display. Furthermore, in the HMI 31, a display device included in a navigation device, an instrument panel, a camera monitoring system (CMS), an electronic mirror, a lamp, or the like provided in the vehicle 1 can also be used as the output device that outputs the visual information.

As an output device from which the HMI 31 outputs the auditory information, for example, an audio speaker, a headphone, or an earphone can be applied.

As an output device to which the HMI 31 outputs the haptic information, for example, a haptic element using a haptic technology can be applied. The haptic element is provided, for example, at a portion to be touched by an occupant of the vehicle 1, such as a steering wheel or a seat.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 performs detection, control, or the like of a state of a steering system of the vehicle 1. The steering system includes, for example, a steering mechanism including a steering wheel or the like, an electric power steering, or the like. The steering control unit 81 includes, for example, a steering ECU that controls the steering system, an actuator that drives the steering system, and the like.

The brake control unit 82 performs detection, control, or the like of a state of a brake system of the vehicle 1. The brake system includes, for example, a brake mechanism including a brake pedal or the like, an antilock brake system (ABS), a regenerative brake mechanism, or the like. The brake control unit 82 includes, for example, a brake ECU that controls the brake system, an actuator that drives the brake system, and the like.

The drive control unit 83 performs detection, control, or the like of a state of a drive system of the vehicle 1. The drive system includes, for example, an accelerator pedal, a driving force generation device for generating a driving force such as an internal combustion engine or a driving motor, a driving force transmission mechanism for transmitting the driving force to wheels, or the like. The drive control unit 83 includes, for example, a drive ECU that controls the drive system, an actuator that drives the drive system, and the like.

The body system control unit 84 performs detection, control, or the like of a state of a body system of the vehicle 1. The body system includes, for example, a keyless entry system, a smart key system, a power window device, a power seat, an air conditioner, an airbag, a seat belt, a shift lever, or the like. The body system control unit 84 includes, for example, a body system ECU that controls the body system, an actuator that drives the body system, and the like.

The light control unit 85 performs detection, control, or the like of states of various lights of the vehicle 1. As the lights to be controlled, for example, a headlight, a backlight, a fog light, a turn signal, a brake light, a projection light, a bumper indicator, or the like can be considered. The light control unit 85 includes a light ECU that controls the lights, an actuator that drives the lights, and the like.

The horn control unit 86 performs detection, control, or the like of a state of a car horn of the vehicle 1. The horn control unit 86 includes, for example, a horn ECU that controls the car horn, an actuator that drives the car horn, and the like.

Figure 2:
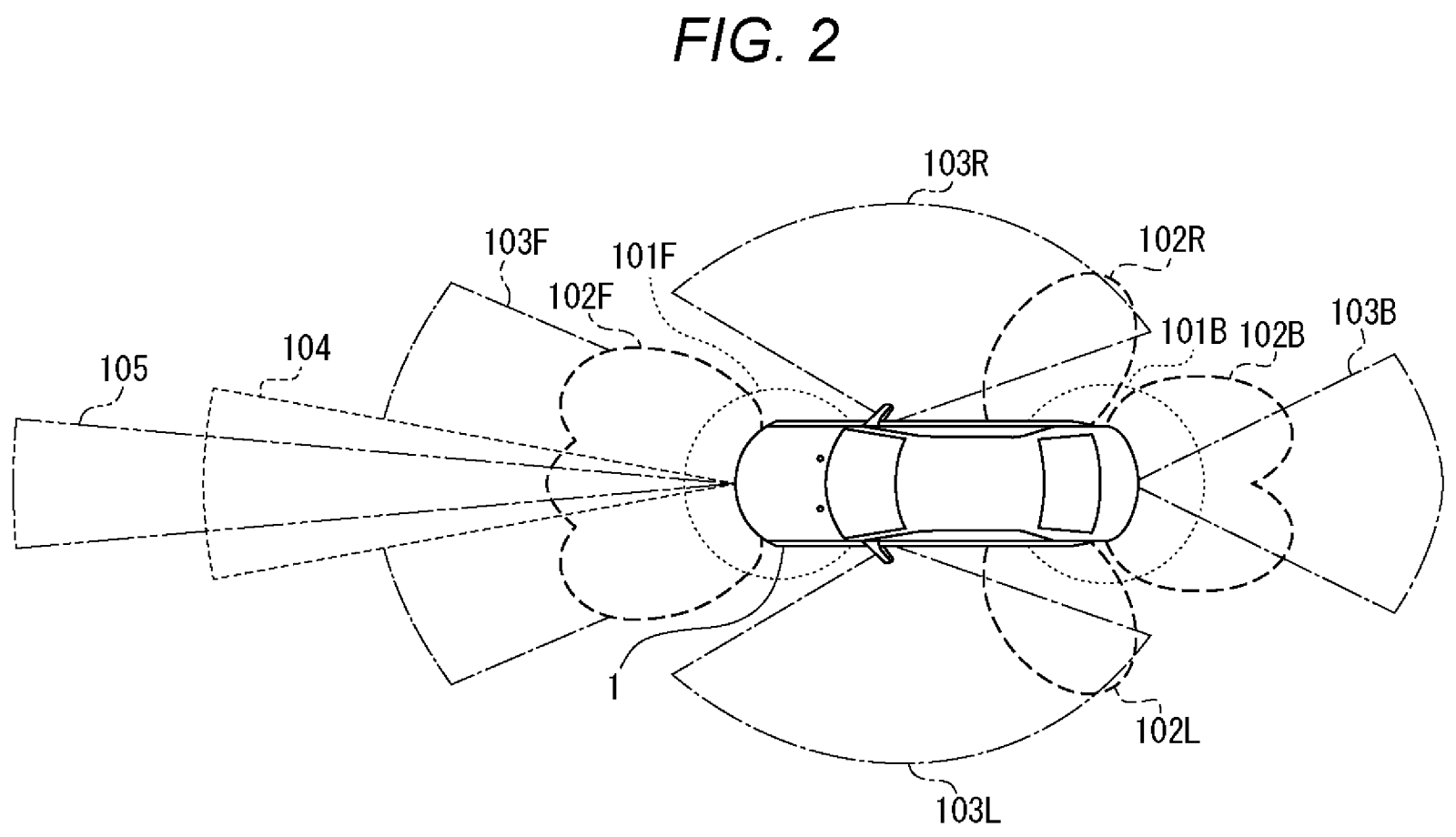

FIG. 2 is a diagram illustrating examples of sensing areas by the camera 51, the radar 52, the LiDAR 53, the ultrasonic sensor 54, or the like of the external recognition sensor 25 of FIG. 1. Note that, FIG. 2 schematically depicts the vehicle 1 as viewed from above, where a left end side is the front end (front) side of the vehicle 1 and a right end side is the rear end (rear) side of the vehicle 1.

Sensing areas 101F and 101B illustrate examples of the sensing area of the ultrasonic sensor 54. The sensing area 101F covers an area around the front end of the vehicle 1 by a plurality of the ultrasonic sensors 54. The sensing area 101B covers an area around the rear end of the vehicle 1 by a plurality of the ultrasonic sensors 54.

Sensing results in the sensing areas 101F and 101B are used, for example, for parking assistance of the vehicle 1 or the like.

Sensing areas 102F to 102B illustrate examples of sensing areas of a short-range or medium-range radar 52. The sensing area 102F covers an area extending farther than the sensing area 101F in front of the vehicle 1. The sensing area 102B covers an area extending farther than the sensing area 101B behind the vehicle 1. The sensing area 102L covers an area around the rear-left side of the vehicle 1. The sensing area 102R covers an area around the rear-right side of the vehicle 1.

A sensing result in the sensing area 102F is used for, for example, detection of a vehicle, a pedestrian, or the like present in front of the vehicle 1, and the like. A sensing result in the sensing area 102B is used for, for example, a function of preventing a collision of the rear of the vehicle 1, and the like. The sensing results in the sensing areas 102L and 102R are used for, for example, detection of an object in a blind spot on the sides of the vehicle 1, or the like.

Sensing areas 103F to 103B illustrate examples of sensing areas of the camera 51. The sensing area 103F covers an area extending farther than the sensing area 102F in front of the vehicle 1. The sensing area 103B covers an area extending farther than the sensing area 102B behind the vehicle 1. The sensing area 103L covers an area around the left side of the vehicle 1. The sensing area 103R covers an area around the right side of the vehicle 1.

A sensing result in the sensing area 103F can be used for, for example, recognition of a traffic light or a traffic sign, a lane departure prevention assist system, and an automatic headlight control system. A sensing result in the sensing area 103B can be used for, for example, parking assistance, a surround view system, or the like. Sensing results in the sensing areas 103L and 103R can be used for, for example, a surround view system.

A sensing area 104 is an example of a sensing area of the LIDAR 53. The sensing area 104 covers an area extending farther than the sensing area 103F in front of the vehicle 1. Meanwhile, the sensing area 104 has a narrower range in a left-right direction than the sensing area 103F.

A sensing result in the sensing area 104 is used for, for example, detection of an object such as a neighboring vehicle.

A sensing area 105 is an example of a sensing area of the radar 52 for a long range. The sensing area 105 covers an area extending farther than the sensing area 104 in front of the vehicle 1. Meanwhile, the sensing area 105 has a narrower range in the left-right direction than the sensing area 104.

A result of sensing in the sensing area 105 is used, for example, for adaptive cruise control (ACC), emergency braking, collision avoidance, and the like.

Note that, the respective sensing areas of the sensors: the camera 51; the radar 52; the LiDAR 53; and the ultrasonic sensor 54, included in the external recognition sensor 25 may have various configurations other than those of FIG. 2. Specifically, the ultrasonic sensor 54 may also perform sensing on the sides of the vehicle 1, or the LiDAR 53 may perform sensing on the rear of the vehicle 1. Furthermore, the installation position of each sensor is not limited to each example described above. Furthermore, the number of each sensor may be one or more.

2. Problems of Conventional Recognition Processing

In the above-described vehicle control system 11, for example, when the vehicle 1 controlled by automatic driving is parked behind, it is possible to avoid collision with a pedestrian by performing pedestrian recognition on a wide-angle image captured by a wide-angle camera to which a fisheye lens is attached.

In a case where object recognition such as pedestrian recognition is performed on such a wide-angle image, the body looks inclined as the recognition target is separated from the center of the angle of view in the horizontal direction. In this way, in a state where the recognition target is inclined obliquely, matching cannot be performed at the time of recognition processing, and recognition cannot be correctly performed.

Figure 3:
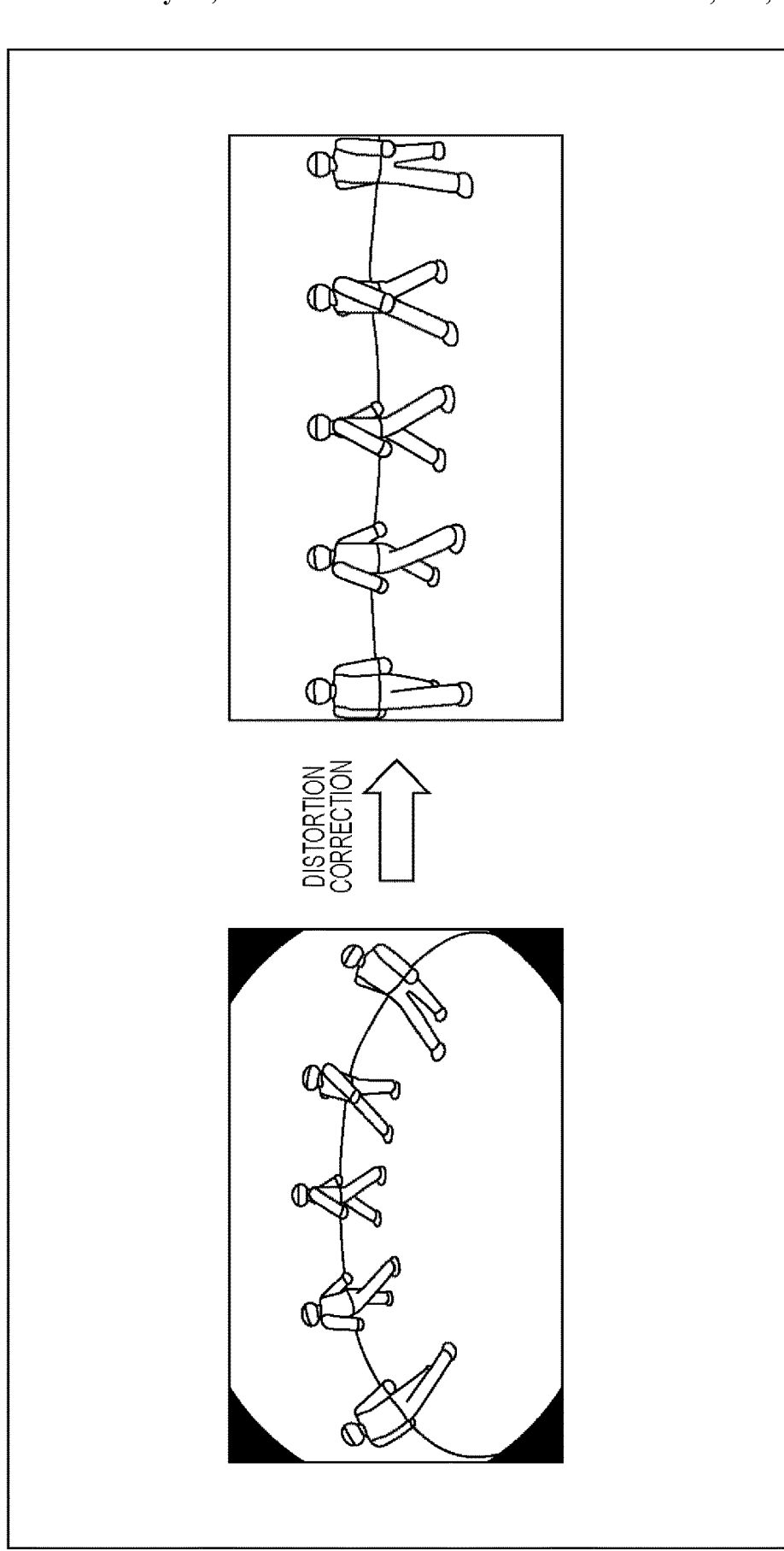
FIG. 3 is a diagram for explaining cylinder correction.

On the other hand, it is known to perform distortion correction processing called cylindrical correction as illustrated in FIG. 3. In the cylindrical correction, since the distortion in the vertical direction of the angle of view is suppressed, the body does not appear inclined diagonally regardless of where the recognition target is present in the angle of view.

On the other hand, in the cylindrically corrected wide-angle image, the appearance is greatly different between the case where the recognition target is far away and the case where the recognition target is in the vicinity. In general, since recognition processing is executed using the appearance of a far recognition target as teacher data, it is often impossible to correctly recognize a nearby recognition target. Although there are several methods for cylindrical correction, it is not easy to ensure robustness of a target that is a recognition target, for example, a change in appearance of a nearby recognition target becomes larger as a method of making a far recognition target look larger is adopted to improve recognition performance.

In general, it is possible to improve the robustness of the target by increasing the number of recognition dictionaries and subdividing the scene and the subject. Therefore, in the object recognition for the cylindrically corrected wide-angle image, the recognition rate can be increased by dividing the recognition dictionaries into a far dictionary in which a far target is learned for each pattern (for each feature) such as a scene or a subject and a nearby dictionary in which a near target is learned for each pattern.

FIG. 4 is a diagram illustrating examples of patterns of recognition dictionaries.

FIG. 4 illustrates recognition dictionaries (a far dictionary A and a nearby dictionary B) used for pedestrian recognition, and the far dictionary A and the nearby dictionary B are divided for each of height (adult or child) and body shape (thin or thick) as patterns. Specifically, dictionaries A-1 and B-1 are prepared as a far dictionary A and a nearby dictionary B learned for a thin adult, and dictionaries A-2 and B-2 are prepared as a far dictionary A and a nearby dictionary B learned for a thick adult. Similarly, dictionaries A-3 and B-3 are prepared as a far dictionary A and a nearby dictionary B learned for a thin child, and dictionaries A-4 and B-4 are prepared as a far dictionary A and a nearby dictionary B learned for a thick child.

The pattern of the way of dividing the recognition dictionary illustrated in FIG. 4 is an example, and each of the far dictionary A and the nearby dictionary B used for pedestrian recognition may be divided for each of sex, race, presence or absence of a bicycle, clothes, weather, illuminance, whole body or part of a body (for example, only the lower body), or the like.

Figure 5:
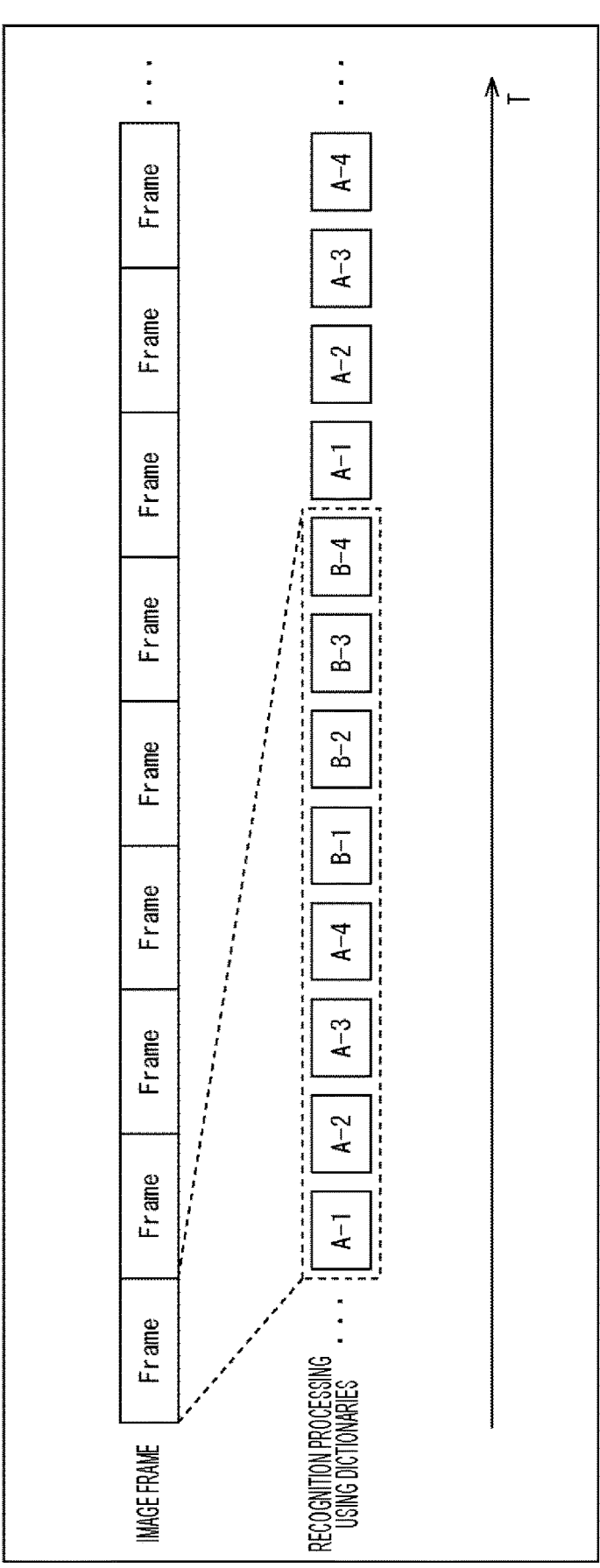
FIG. 5 is a diagram illustrating an example of conventional recognition processing using recognition dictionaries.

FIG. 5 is a diagram illustrating an example of conventional recognition processing using the recognition dictionaries (the far dictionary A and the nearby dictionary B) illustrated in FIG. 4.

In the recognition processing, the target is detected using the recognition dictionary for each image frame (hereinafter, it is also simply referred to as a frame) constituting the cylindrically corrected wide-angle image. Therefore, in the pedestrian recognition using the recognition dictionary illustrated in FIG. 4, as illustrated in FIG. 5, it is necessary to execute recognition processing using eight patterns of dictionaries for one frame.

As described above, while the recognition rate can be increased by increasing the number of recognition dictionaries, the time required for the recognition processing for one frame becomes long, and the processing frame rate decreases or the necessary memory increases. On the other hand, for example, by causing one recognition dictionary to learn various patterns, the time required for the recognition processing can be shortened, and a target can be widely detected, but the recognition rate decreases or erroneous detection increases.

As described above, it has not been considered to efficiently execute the object recognition in the conventional recognition processing for the cylindrically corrected wide-angle image.

Therefore, in the recognition processing system to which the present technology is applied, instead of using the far dictionaries and the nearby dictionaries of all patterns, it is realized to dynamically recombine the dictionaries used for the recognition processing.

Specifically, in a case where the target is not in the vicinity, the recognition processing is executed using the far dictionary of each pattern in order. In this case, the time required for the recognition processing for one frame becomes slightly long, but the distance from the target is long, and the collision risk does not increase immediately, and there is no problem.

Thereafter, in a case where the target approaches, recognition processing is executed in which the ratio of using the nearby dictionary is increased. The nearby dictionary used at this time is limited to a nearby dictionary of the same pattern as that of the far dictionary in which the target is recognized with high likelihood among the far dictionaries. As a result, the time required for the recognition processing can be shortened without lowering the recognition rate, and more efficient object recognition can be realized.

3. Configuration and Outline of Operation of Recognition Processing System of Present Technology Hereinafter, a configuration for realizing more efficient object recognition will be described.
(Functional Configuration Example of Recognition Processing System)

Figure 6:
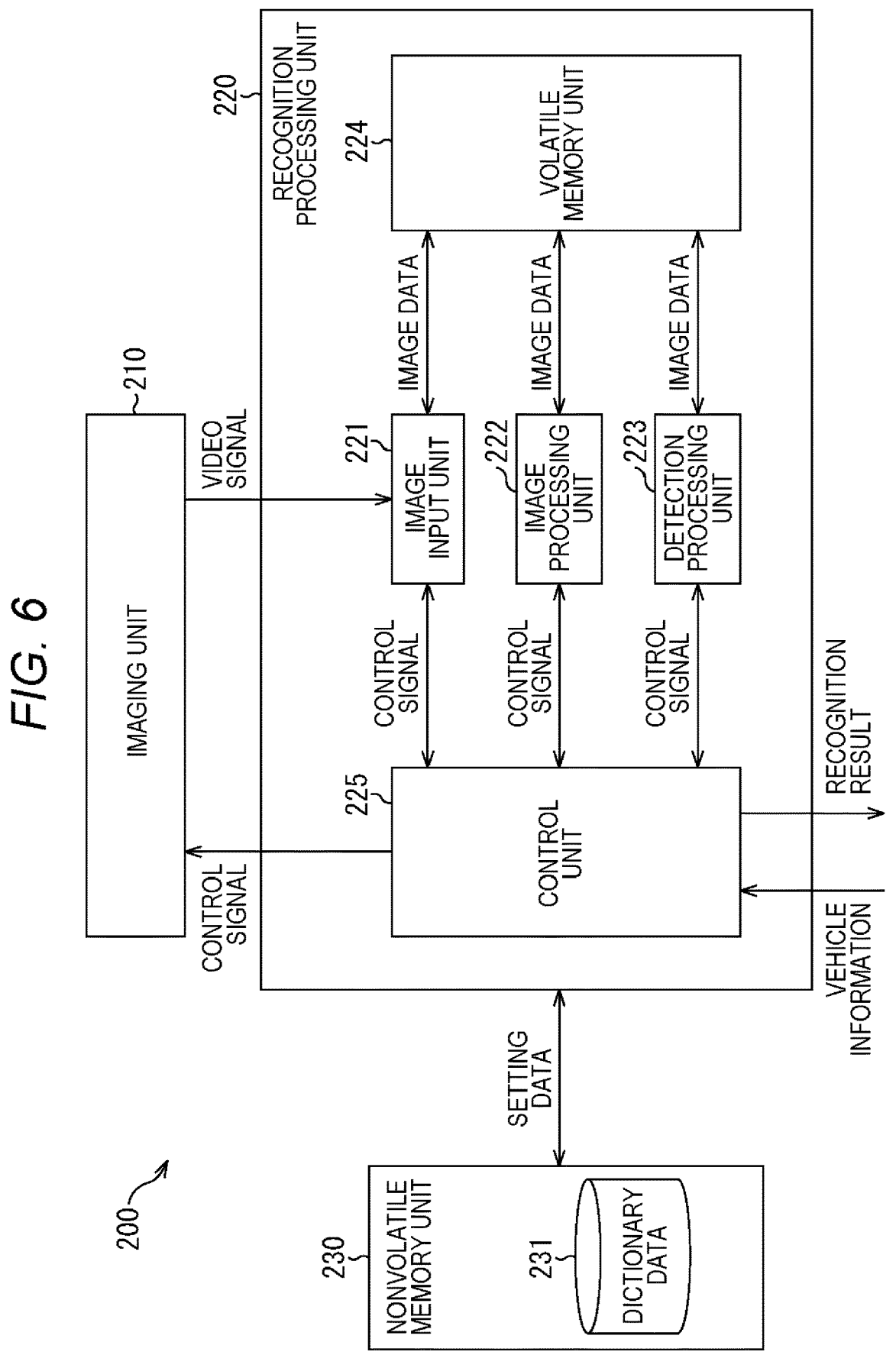
FIG. 6 is a block diagram illustrating a functional configuration example of a recognition processing system to which the present technology is applied.

FIG. 6 is a block diagram illustrating a functional configuration example of a recognition processing system to which the present technology is applied.

A recognition processing system 200 of FIG. 6 has a function of executing processing related to object recognition in the vehicle control system 11 of FIG. 1. The recognition processing system 200 includes an imaging unit 210, a recognition processing unit 20, and a nonvolatile memory unit 230.

The imaging unit 210 corresponds to the camera 51 in the vehicle control system 11 in FIG. 1. The imaging unit 210 is configured as an in-vehicle camera mounted on the vehicle 1. Specifically, the imaging unit 210 is a wide-angle camera to which a fisheye lens is attached, and is configured as, for example, a rear camera that images the rear of the vehicle 1. The imaging unit 210 captures a wide-angle image with the rear of the vehicle 1 as an imaging range on the basis of a control signal from the recognition processing unit 220, and supplies a corresponding video signal to the recognition processing unit 220.

The recognition processing unit 220 corresponds to the recognition processing unit 73 in the vehicle control system 11 of FIG. 1, and is realized by, for example, one image recognition chip (device). The recognition processing unit 220 executes recognition processing of detecting and recognizing an object included in a wide-angle image captured by the imaging unit 210 configured as a wide-angle camera.

Note that, in the following description, it is assumed that the recognition target of the recognition processing unit 220 is a pedestrian present around the vehicle 1, but the recognition target is not limited to the pedestrian, and may be any object such as another vehicle, a bicycle, an obstacle, a structure, a road, a traffic light, a traffic sign, or a road sign.

The recognition processing unit 220 includes an image input unit 221, an image processing unit 222, a detection processing unit 223, a volatile memory unit 224, and a control unit 225.

The image input unit 221 receives an input of a video signal from the imaging unit 210 on the basis of a control signal from the control unit 225, and sequentially stores each frame constituting a corresponding wide-angle image in the volatile memory unit 224.

The image processing unit 222 performs various types of image processing on the wide-angle image stored in the volatile memory unit 224 on the basis of the control signal from the control unit 225. Specifically, the image processing unit 222 performs cylindrical correction on the wide-angle image and performs development processing for object recognition. Each frame constituting the wide-angle image subjected to the image processing is sequentially stored in the volatile memory unit 224.

The detection processing unit 223 executes object detection processing and recognition processing on each frame of the wide-angle image stored in the volatile memory unit 224 on the basis of the control signal from the control unit 225. Specifically, the detection processing unit 223 detects and recognizes an object included in each frame of the wide-angle image using dictionary data 231 stored in the nonvolatile memory unit 230. The processing result (recognition result) of the detection processing unit 223 is appropriately output to the HMI 31 (FIG. 1) or the like via the control unit 225.

The volatile memory unit 224 includes, for example, a synchronous dynamic random access memory (SDRAM) or the like, and temporarily stores each frame of the wide-angle image. Each frame of the wide-angle image stored in the volatile memory unit 224 is read by the image processing unit 222 and the detection processing unit 223 as appropriate.

The control unit 225 includes a CPU and the like, and controls the operation of each unit of the imaging unit 210 and the recognition processing unit 220 by outputting a control signal. For example, the control unit 225 controls operations of the imaging unit 210 and the detection processing unit 223 on the basis of vehicle information indicating a state of each unit of the vehicle 1, a situation around the vehicle 1, and the like.

The nonvolatile memory unit 230 corresponds to the storage unit 28 in the vehicle control system 11 of FIG. 1, and stores setting data used by each unit of the recognition processing unit 220. The setting data stored in the nonvolatile memory unit 230 includes the dictionary data 231

(recognition dictionary) used for the recognition processing of the recognition processing unit 220. That is, the nonvolatile memory unit 230 also functions as a dictionary data storage unit that stores the dictionary data 231.

Note that the recognition processing system 200 is not limited to the configuration illustrated of FIG. 6, and may adopt any configuration. For example, each unit constituting the recognition processing unit 220 may be dispersedly provided in a plurality of chips (devices), or a part thereof may be provided in the imaging unit 210. Furthermore, the recognition processing system 200 may include a recognition processing device including the recognition processing unit 220 and the nonvolatile memory unit 230, and the imaging unit 210. Furthermore, the entire recognition processing system 200 may be configured as a single device such as one wide-angle camera.

FIG. 7 is a diagram illustrating examples of patterns of recognition dictionaries according to the present technology stored as the dictionary data 231 in the nonvolatile memory unit 230.

FIG. 7 illustrates recognition dictionaries (a far dictionary A and a nearby dictionary B) used for pedestrian recognition, similarly to the recognition dictionary illustrated in FIG. 4, and each of the far dictionary A and the nearby dictionary B is divided for each height (adult or child) and body shape (thin or thick) as a pattern (feature) of a recognition target.

Furthermore, in the example of FIG. 7, general-purpose dictionaries for general-purpose object recognition are included in addition to patterns similar to those of the recognition dictionaries illustrated in FIG. 4. Specifically, dictionaries A-0 and B-0 are further prepared as a far dictionary A and a nearby dictionary B (a general-purpose far dictionary and a general-purpose nearby dictionary) which are learned by targeting various pedestrians (persons). According to the dictionaries A-0 and B-0, for example, it is not possible to recognize the attribute of the pedestrian existing behind the vehicle 1, but it is possible to detect that the pedestrian is present behind the vehicle 1.

In contrast to the general-purpose dictionaries such as the dictionaries A-0 and B-0, the dictionaries A-1, B-1, . . . , A-4, and B-4 can be said to be dictionaries specialized for object recognition of a specific pattern. That is, it can be said that the dictionaries A-1 to A-4 are specialized far dictionaries in which far targets are learned for each specific pattern, and the dictionaries B-1 to B-4 are specialized nearby dictionaries in which nearby targets are learned for each specific pattern.

(Outline of Operation of Recognition Processing System)

Figure 8:
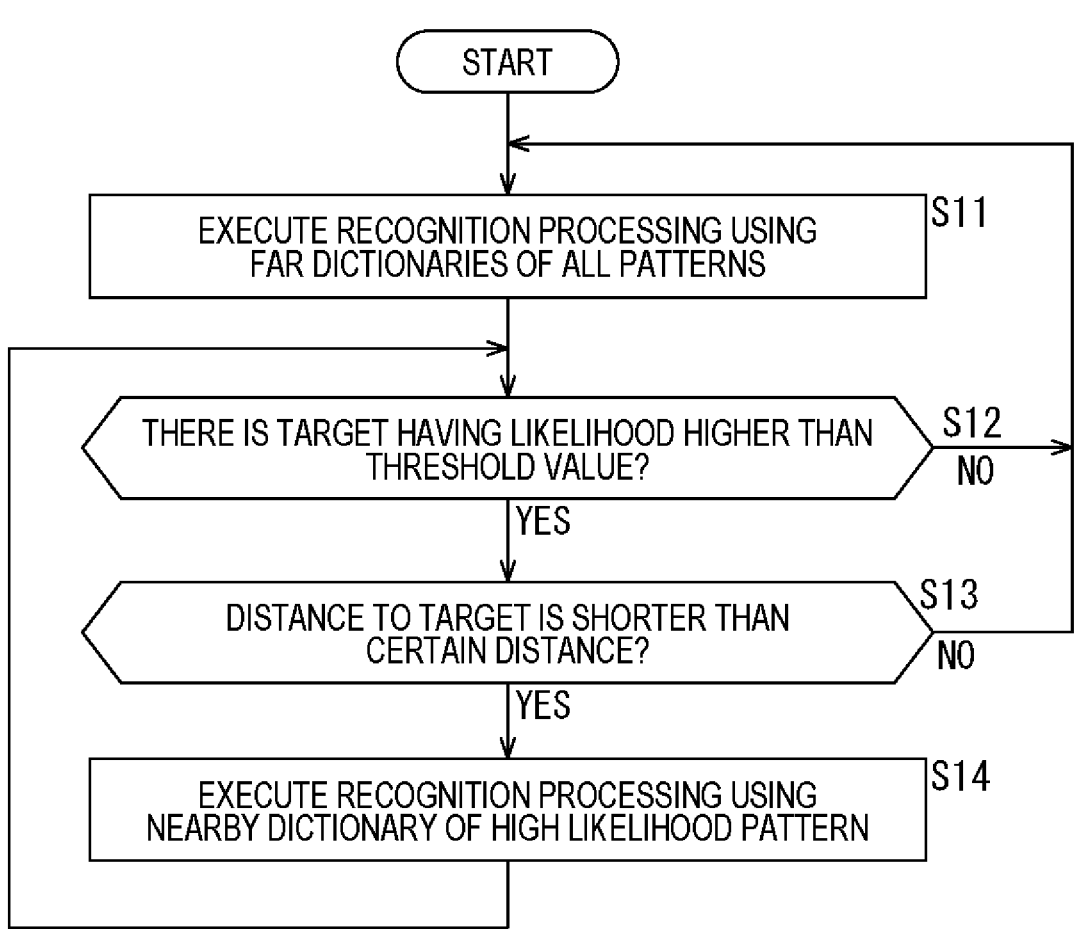
FIG. 8 is a flowchart illustrating an outline of an operation of the recognition processing system.

Next, an outline of an operation of the recognition processing system 200 of FIG. 6 will be described with reference to a flowchart of FIG. 8. Each step of the processing of FIG. 8 is executed in units of frames constituting the cylindrically corrected wide-angle image.

In step S11, the recognition processing unit 220 (detection processing unit 223) executes recognition processing on the latest frame acquired at that time by using far dictionaries (specifically, dictionaries A-0 to A-4 of FIG. 7) of all patterns (a plurality of patterns).

In step S12, the recognition processing unit 220 determines whether or not there is a target having a likelihood, which is an index representing appropriateness (pedestrian likeness), higher than a preset threshold value among targets detected using the far dictionaries of all patterns.

In a case where it is determined that there is no target having a likelihood higher than the threshold value, the processing returns to step S11, and the subsequent processing is repeated for the latest frame acquired at that time. On the other hand, in a case where it is determined that there is a target having a likelihood higher than the threshold value, the processing proceeds to step S13.

In step S13, the recognition processing unit 220 determines whether or not a distance between the vehicle 1 and the target having a likelihood higher than the threshold value is shorter than a certain distance. The distance to the target can be calculated, for example, on the basis of the position information of the vehicle 1 and the position of the target detected on the basis of various sensor data.

In a case where it is determined that the distance to the target is not shorter (farther) than the certain distance, the processing returns to step S11, and the subsequent processing is repeated for the latest frame acquired at that time.

Up to this point, the time required for the recognition processing for one frame becomes slightly long, but the distance from the target is long, and the collision risk does not increase immediately, and there is no problem.

On the other hand, in a case where it is determined that the distance to the target is shorter than the certain distance, the processing proceeds to step S14.

In step S14, the recognition processing unit 220 executes the recognition processing using a nearby dictionary of the same pattern as the far dictionary of the pattern (hereinafter, referred to as a high likelihood pattern) in which the target is recognized with the likelihood higher than the above-described threshold value among the far dictionaries of all patterns.

Thereafter, the processing returns to step S12, and the subsequent processing is repeated for the latest frame acquired at that time.

According to the above processing, in a case where the target approaches, the recognition processing is executed using only the nearby dictionary of the same pattern as that of the far dictionary in which the target is recognized with high likelihood among the far dictionaries. As a result, the time required for the recognition processing can be shortened without lowering the recognition rate, and more efficient object recognition can be realized.

4. Details of Recognition Processing of Present Technology

Hereinafter, details of recognition processing by the recognition processing system 200 to which the present technology is applied will be described.

Figure 9:
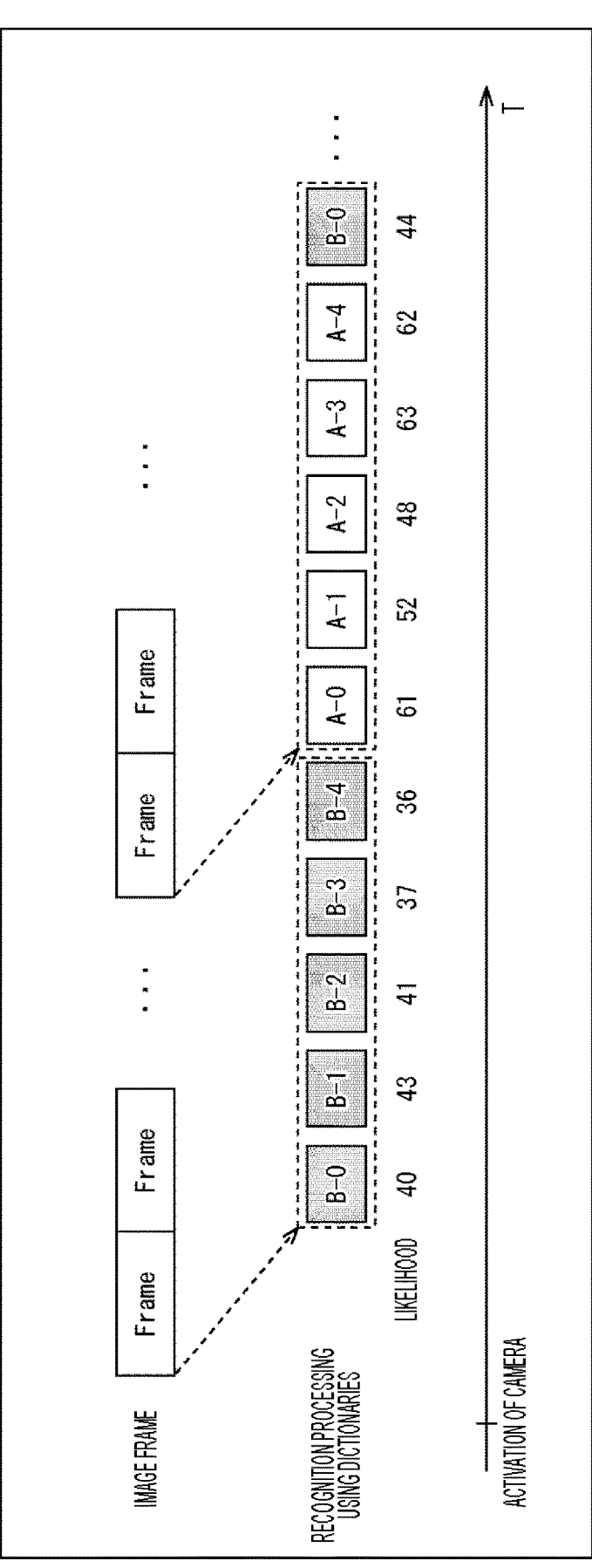
FIG. 9 is a diagram illustrating an example of recognition processing of the present technology using a recognition dictionary.
Figure 10:
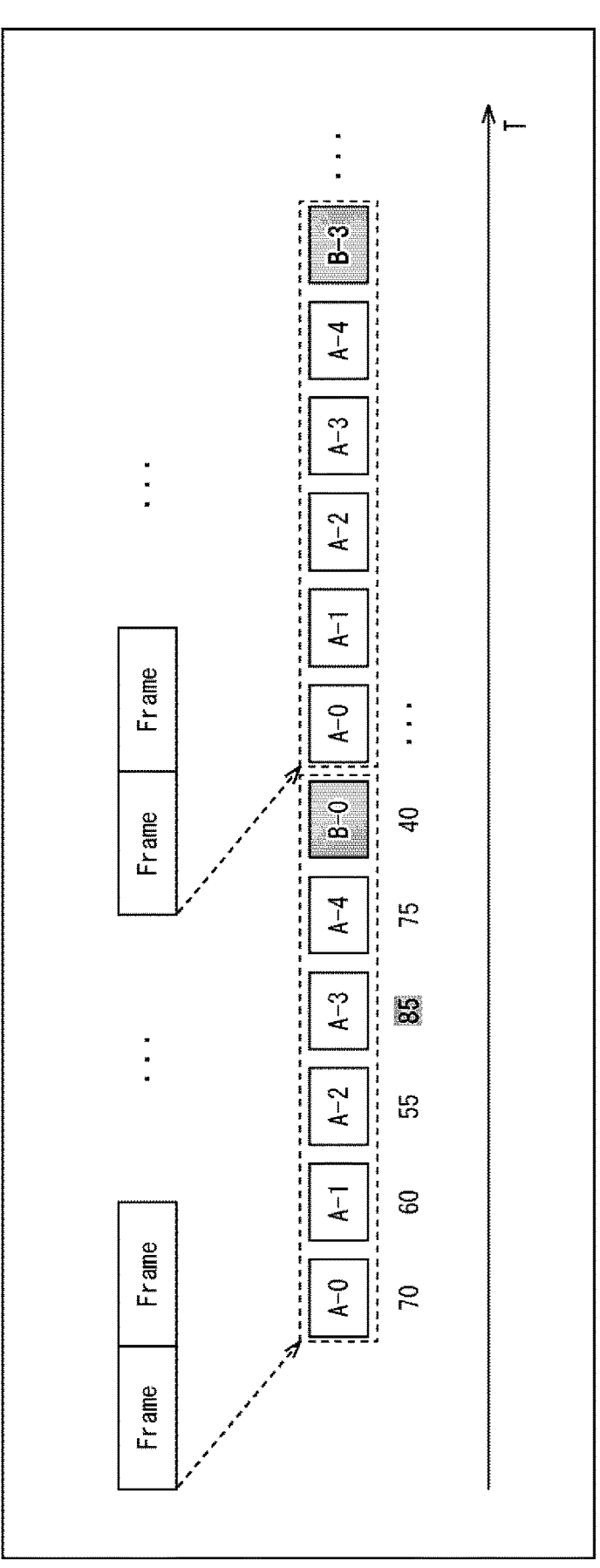
FIG. 10 is a diagram illustrating an example of recognition processing of the present technology using a recognition dictionary.
Figure 11:
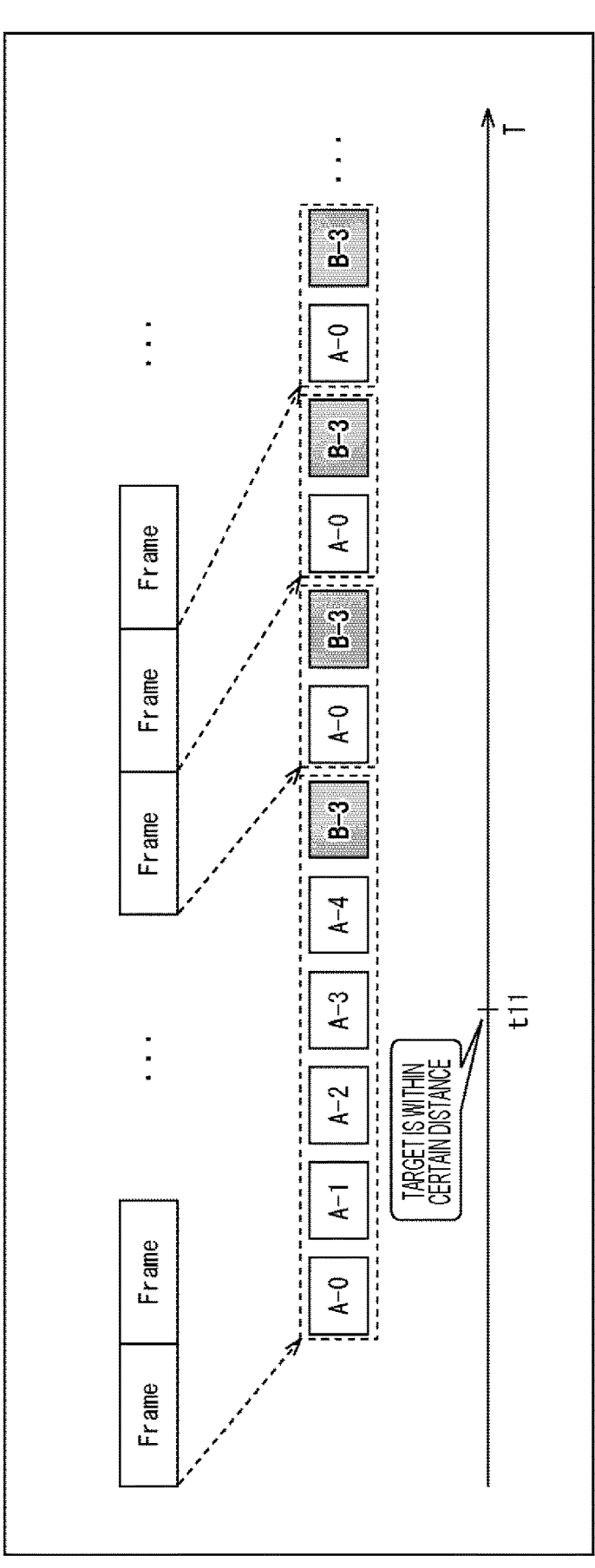
FIG. 11 is a diagram illustrating an example of recognition processing of the present technology using a recognition dictionary.

FIGS. 9 to 11 are diagrams illustrating examples of recognition processing of the present technology using the recognition dictionaries (the far dictionary A and the nearby dictionary B) illustrated in FIG. 7.

Also in the recognition processing of the present technology, the target is detected using the recognition dictionary for each image frame constituting the cylindrically corrected wide-angle image, but unlike the conventional recognition processing illustrated in FIG. 5, it is not necessary to execute the recognition processing using the dictionaries of all patterns for one frame.

Note that, in the examples of FIGS. 9 to 11, the likelihood of the target derived by the recognition processing is illustrated under each of the rectangles representing the dictionaries used for the recognition processing.

First, as illustrated in FIG. 9, immediately after the camera (imaging unit 210) is activated, recognition processing using nearby dictionaries (dictionaries B-0 to B-4) of all patterns is executed for the latest frame. As described above, at the timing immediately after the camera is activated (at the start of the recognition processing), the recognition processing using the nearby dictionaries is executed in order to avoid collision with an object existing near the vehicle 1.

When the recognition processing using the nearby dictionaries of all patterns is ended, the recognition processing using the far dictionaries (dictionaries A-0 to A-4) of all patterns and a general-purpose nearby dictionary (dictionary B-0) is started for the latest frame at that time. That is, here, the recognition processing of widely detecting an object present near the vehicle 1 while detecting an object present at a position far from the vehicle 1 in detail is repeated.

It is assumed that the likelihood (85) of the target derived by the recognition processing using the dictionary A-3 exceeds the threshold value as illustrated in FIG. 10 while the recognition processing using the far dictionaries of all patterns and the general-purpose nearby dictionary is repeated.

In this case, the recognition processing using the far dictionaries (dictionaries A-0 to A-4) of all patterns and the specialized nearby dictionary (dictionary B-3) of the same pattern as the dictionary A-3 of the high likelihood pattern is started for the latest frame at the time point when the series of recognition processing is ended. That is, here, the recognition processing of detecting an object present near the vehicle 1 under the same conditions as those of the far dictionary in which the target is detected with high likelihood is repeated while detecting an object present at a position far from the vehicle 1 in detail.

As illustrated in FIG. 11, it is assumed that a target detected with high likelihood approaches a position within a certain distance from the vehicle 1 at timing t11 while the recognition processing using the far dictionaries of all patterns and the nearby dictionary of the high likelihood pattern is repeated.

In this case, the recognition processing using the far general-purpose dictionary (dictionary A-0) and the specialized nearby dictionary (dictionary B-3) of the high likelihood pattern is started for the latest frame at the time point when the series of recognition processing is ended. That is, here, the recognition processing of detecting a target having high likelihood existing near the vehicle 1 while widely detecting an object existing at a position far from the vehicle 1 is repeated.

As described above, as the target approaches within a certain distance, the dictionaries used for the recognition processing are handed over to the far dictionaries of all patterns and the general-purpose nearby dictionary, the far dictionaries of all patterns and the nearby dictionary of the high likelihood pattern, and the general-purpose far dictionary and the nearby dictionary of the high likelihood pattern. As a result, the time required for the recognition processing is shortened, the processing frame rate can be increased, and the necessary memory can be reduced.

Next, details of the recognition processing of the present technology for realizing the recognition processing of FIGS. 9 to 11 will be described with reference to flowcharts of FIGS. 12 to 15. The processing of FIGS. 12 to 15 is started when the camera (imaging unit 210) is activated.

In step S101, the recognition processing unit 220 (detection processing unit 223) acquires the latest frame among the frames of the cylindrically corrected wide-angle image stored in the volatile memory unit 224.

In step S102, the recognition processing unit 220 executes recognition processing using the nearby dictionaries of all patterns.

In step S103, the recognition processing unit 220 determines whether or not there is a target having a likelihood higher than a threshold value among targets detected using the nearby dictionaries of all patterns.

In a case where it is determined in step S103 that there is a target having a likelihood higher than the threshold value, the processing proceeds to step S104.

In step S104, the recognition processing unit 220 numbers the target having the likelihood higher than the threshold value, and associates the likelihood, the position information, and the TTC (Time-To-Collision). Thereafter, the processing proceeds to step S105.

Here, the same target can be individually numbered by recognition processing using a dictionary for each pattern. Furthermore, the position information may represent a relative position with respect to the vehicle 1, may represent a position within the angle of view of the wide-angle image, or may represent coordinates in real space. The TTC is an index indicating a time until the vehicle 1 collides with the target.

On the other hand, in a case where it is determined in step S103 that there is no target having a likelihood higher than the threshold value, step S104 is skipped, and the processing proceeds to step S105.

As described above, at the timing immediately after the camera is activated (at the start of the recognition processing), the recognition processing using the nearby dictionary is executed in order to avoid collision with an object existing near the vehicle 1.

In step S105, the recognition processing unit 220 determines whether or not there is a numbered target is present. Here, it is assumed that there is no numbered target, and the processing proceeds to step S111 of FIG. 13.

In step S111, the recognition processing unit 220 acquires the latest frame at that time among the frames of the cylindrically corrected wide-angle image stored in the volatile memory unit 224.

In step S112, the recognition processing unit 220 executes recognition processing using the far dictionaries of all patterns.

In step S113, the recognition processing unit 220 determines whether or not there is a target having a likelihood higher than a threshold value among targets detected using the far dictionaries of all patterns.

In a case where it is determined in step S113 that there is a target having a likelihood higher than the threshold value, the processing proceeds to step S114.

In step S114, the recognition processing unit 220 numbers the target having the likelihood higher than the threshold value, and associates the likelihood, the position information, and the TTC. Thereafter, the processing proceeds to step S115.

On the other hand, in a case where it is determined in step S113 that there is no target having a likelihood higher than the threshold value, step S114 is skipped, and the processing proceeds to step S115.

In step S115, the recognition processing unit 220 executes recognition processing using the general-purpose nearby dictionary.

In step S116, the recognition processing unit 220 determines whether or not there is a target having a likelihood higher than a threshold value among targets detected using the general-purpose nearby dictionary.

In a case where it is determined in step S116 that there is a target having a likelihood higher than the threshold value, the processing proceeds to step S117.

In step S117, the recognition processing unit 220 numbers the target having the likelihood higher than the threshold value, and associates the likelihood, the position information, and the TTC. Thereafter, the processing returns to step S105 of FIG. 12.

Figure 12:
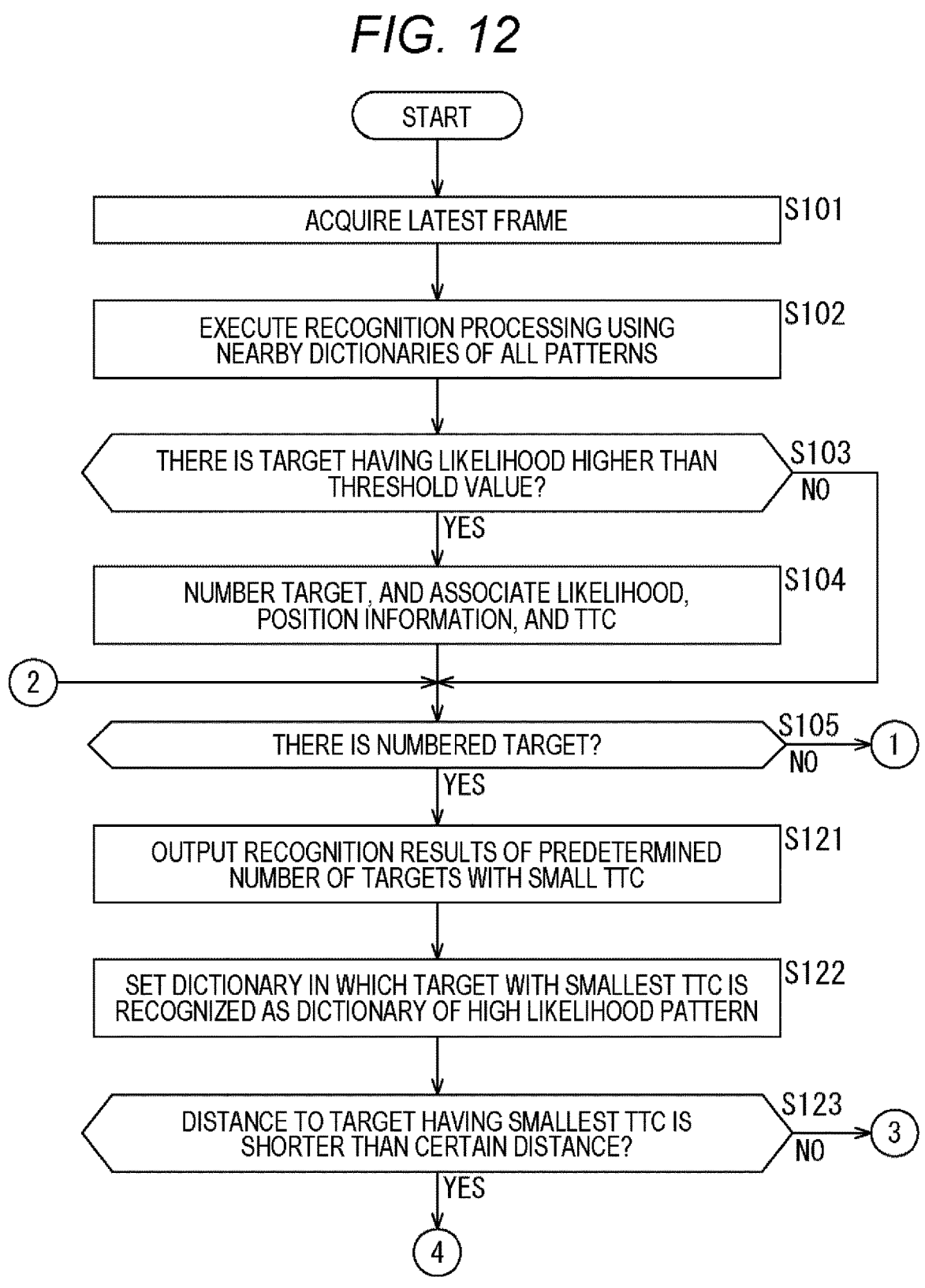
FIG. 12 is a flowchart illustrating details of recognition processing of the present technology.

On the other hand, in a case where it is determined in step S116 that there is no target having a likelihood higher than the threshold value, step S117 is skipped, and the processing returns to step S105 of FIG. 12.

In step S105 of FIG. 12, steps S111 to S117 are repeated until it is determined that there is a numbered target.

As described above, the recognition processing of widely detecting an object present near the vehicle 1 while detecting an object present at a position far from the vehicle 1 in detail is repeated.

When it is determined in step S105 of FIG. 12 that there is a numbered target, the processing proceeds to step S121.

In step S121, the recognition processing unit 220 arranges the numbered targets in ascending order of TTC, and outputs the recognition results of a predetermined number of targets with small TTC to the subsequent stage. As a result, the driver or the like is notified of the presence of a pedestrian or the like around the vehicle 1 (in particular, behind vehicle 1).

In step S122, the recognition processing unit 220 sets the dictionary in which the target with the smallest TTC, in other words, the target with the shortest time until collision of the vehicle 1 is recognized as the dictionary of the high likelihood pattern.

Note that, among the numbered targets, targets having substantially the same position information are regarded as the same target, and a target having the highest likelihood is adopted and the other targets are excluded.

Figure 16:
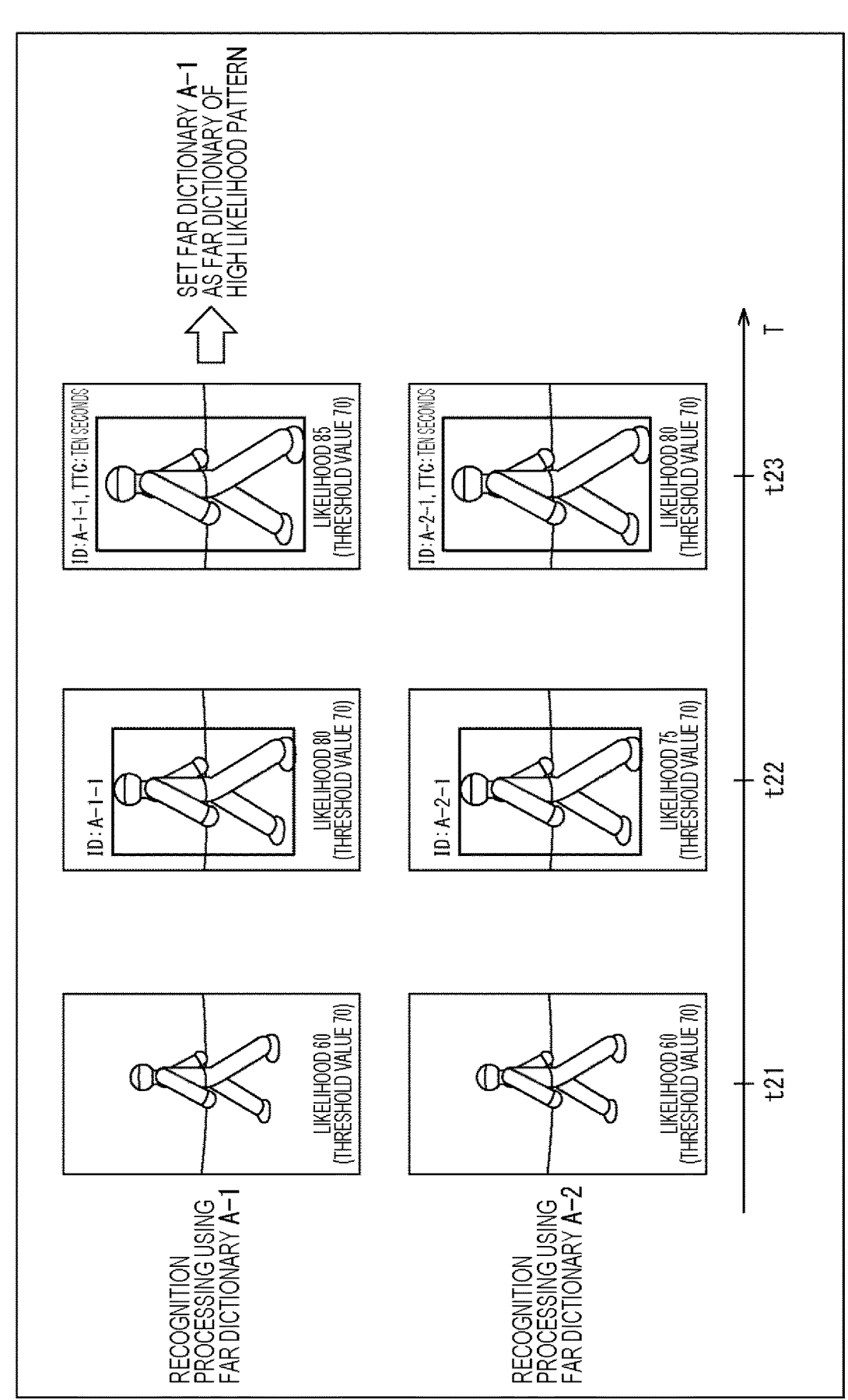
FIG. 16 is a diagram for explaining setting of a dictionary of a high likelihood pattern.

FIG. 16 is a diagram illustrating an example in which the same target is recognized in the recognition processing using the dictionary A-1 which is a far dictionary and the recognition processing using the dictionary A-2. In the example of FIG. 16, the threshold value of the likelihood in the recognition processing is 70.

For the frame at timing t21, the likelihood of the target is 60 lower than the threshold value in each of the recognition processing using the dictionary A-1 and the recognition processing using the dictionary A-2, and the target is not numbered.

Subsequently, for the frame at timing t22, in the recognition processing using the dictionary A-1, the likelihood of the target becomes 80 higher than the threshold value, and the target is numbered as ID: A-1-1. Similarly, in the recognition processing using the dictionary A-2, the likelihood of the target is 75 higher than the threshold value, and the target is numbered as ID: A-2-1.

Then, for the frame at timing t23, in the recognition processing using the dictionary A-1, the likelihood of the target numbered as ID: A-1-1 is 85. Similarly, in the recognition processing using the dictionary A-2, the likelihood of the target numbered as ID: A-2-1 is 80. Here, it is assumed that the TTC of the target is 10 seconds which is the smallest.

In this case, the target recognized using the dictionary A-1 having a high likelihood is adopted, and the target recognized using the dictionary A-2 is excluded. As a result, the dictionary A-1 is set as the far dictionary of the high likelihood pattern.

When the dictionary of the high likelihood pattern is set as described above, in step S123, the recognition processing unit 220 determines whether or not the distance to the target having the smallest TTC is shorter than a certain distance. Specifically, by determining whether or not the TTC of the target is shorter than a predetermined time, it is determined whether or not the distance to the target is shorter than a certain distance. Here, it is assumed that the distance to the target is not shorter (farther) than the certain distance, and the processing proceeds to step S131 of FIG. 14.

Figure 13:
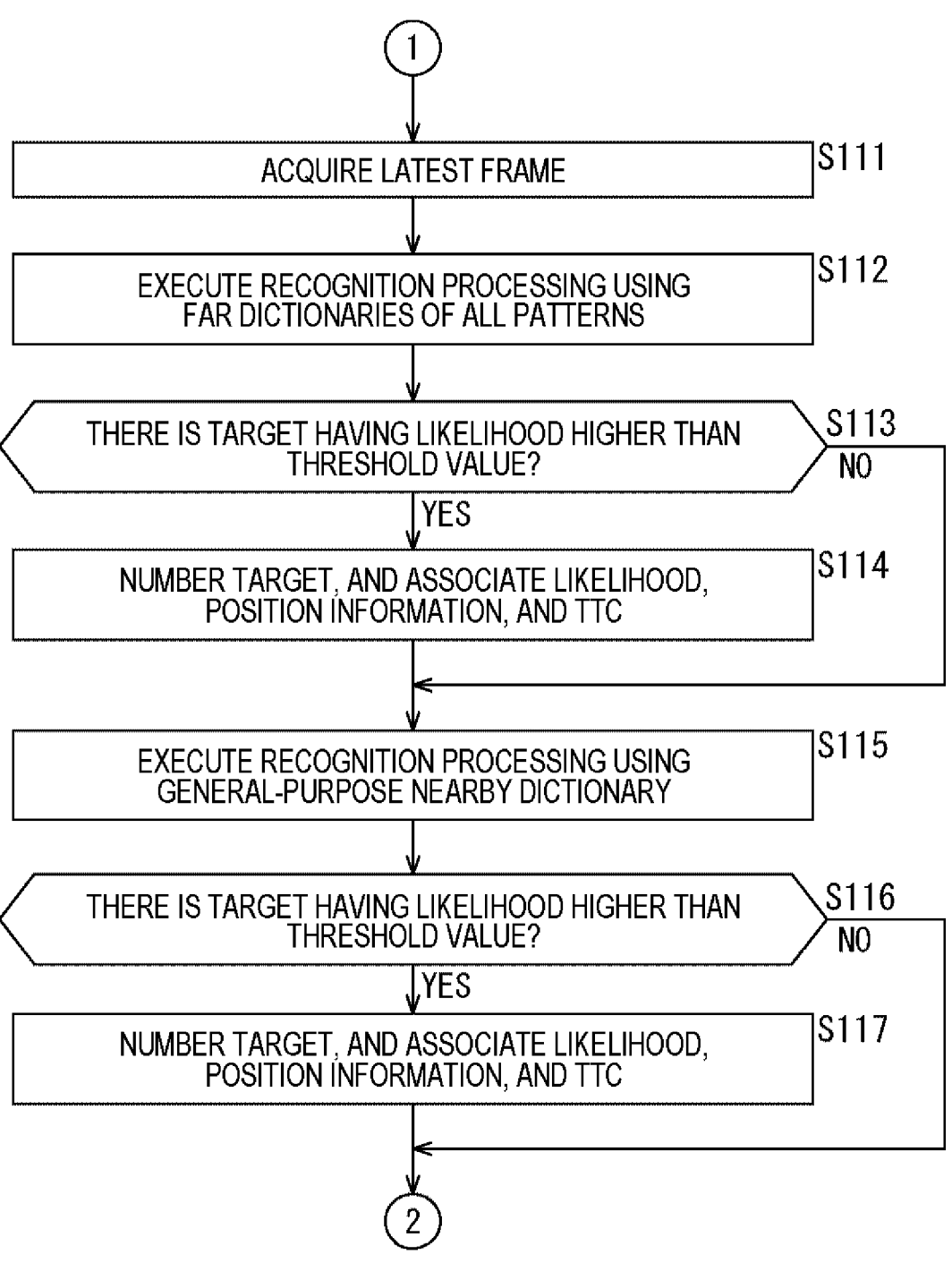
FIG. 13 is a flowchart illustrating details of recognition processing of the present technology.

Note that, the processing in steps S131 to S134 is similar to the processing in steps S111 to S114 of FIG. 13, and thus the description thereof will be omitted.

That is, after the recognition processing using the far dictionaries of all patterns is executed, in step S135, the recognition processing unit 220 executes the recognition processing using the nearby dictionary of the high likelihood pattern.

In step S136, the recognition processing unit 220 determines whether or not there is a target having a likelihood higher than a threshold value among targets detected using the nearby dictionary of the high likelihood pattern.

In a case where it is determined in step S136 that there is a target having a likelihood higher than the threshold value, the processing proceeds to step S137.

In step S137, the recognition processing unit 220 numbers the target having the likelihood higher than the threshold value, and associates the likelihood, the position information, and the TTC. Thereafter, the processing returns to step S105 of FIG. 12 again.

On the other hand, in a case where it is determined in step S136 that there is no target having a likelihood higher than the threshold value, step S137 is skipped, and the processing returns to step S105 of FIG. 12 again.

In a situation where a target is present in the vicinity the vehicle 1, the processing proceeds from step S105 to step S121 of FIG. 12, and steps S121 to S123 and S131 to S137 are repeated until it is determined in step S123 that the distance to the target is shorter than a certain distance.

Note that, in a case where the general-purpose far dictionary is set as the dictionary of the high likelihood pattern, the processing of steps S131 to S137 is the same as the processing of steps S111 to S117.

As described above, the recognition processing of detecting an object present near the vehicle 1 under the same conditions as those of the far dictionary in which the target is detected with high likelihood is repeated while detecting an object present at a position far from the vehicle 1 in detail.

Figure 15:
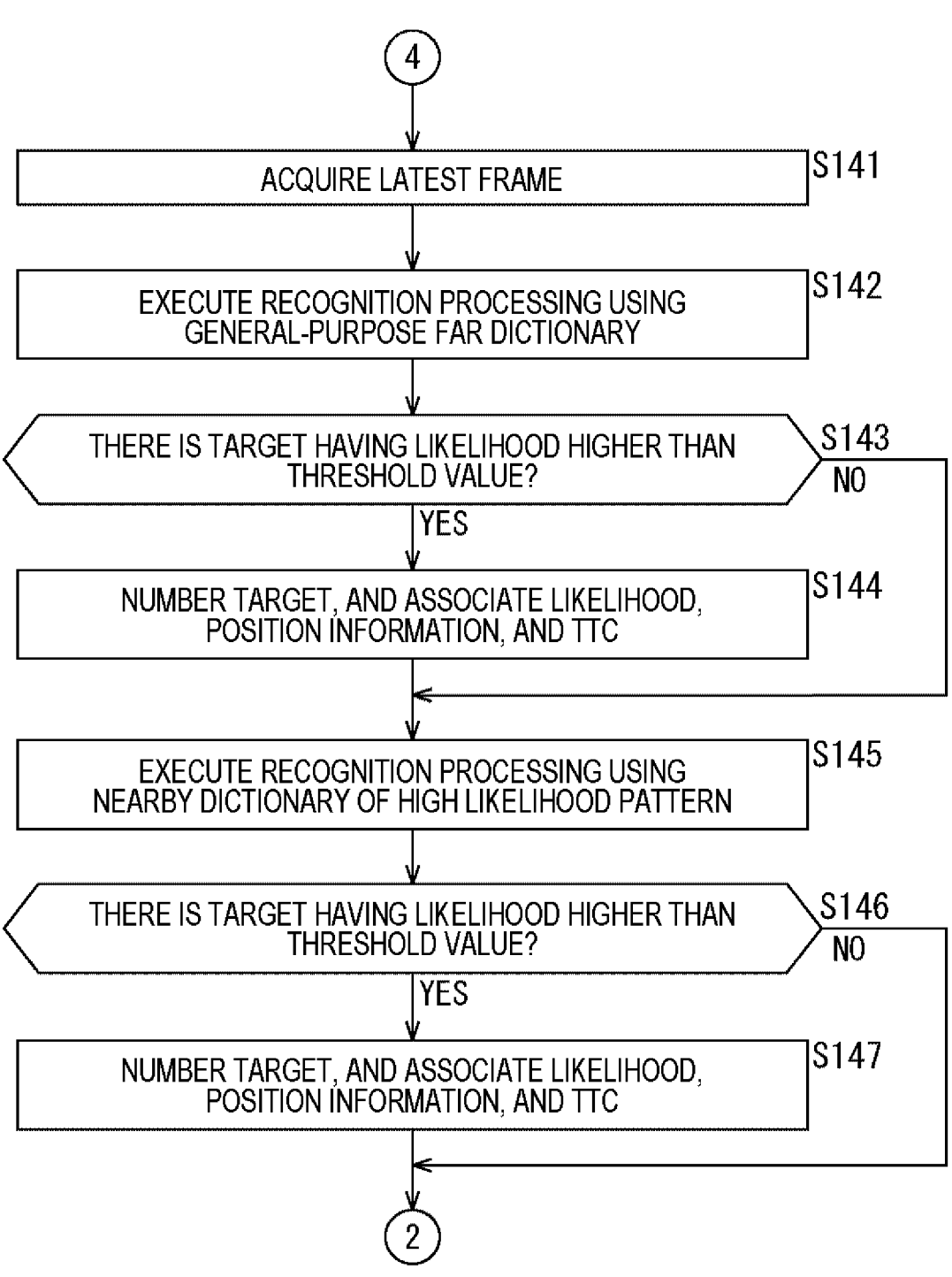
FIG. 15 is a flowchart illustrating details of recognition processing of the present technology.

When it is determined in step S123 of FIG. 12 that the distance to the target having the smallest TTC is shorter than the certain distance, the processing proceeds to step S141 of FIG. 15.

In step S141, the recognition processing unit 220 acquires the latest frame at that time among the frames of the cylindrically corrected wide-angle image stored in the volatile memory unit 224.

In step S142, the recognition processing unit 220 executes recognition processing using the general-purpose far dictionary.

In step S143, the recognition processing unit 220 determines whether or not there is a target having a likelihood higher than a threshold value among targets detected using the general-purpose far dictionary.

In a case where it is determined in step S143 that there is a target having a likelihood higher than the threshold value, the processing proceeds to step S144.

In step S144, the recognition processing unit 220 numbers the target having the likelihood higher than the threshold value, and associates the likelihood, the position information, and the TTC. Thereafter, the processing proceeds to step S145.

On the other hand, in a case where it is determined in step S143 that there is no target having a likelihood higher than the threshold value, step S144 is skipped, and the processing proceeds to step S145.

In step S145, the recognition processing unit 220 executes the recognition processing using the nearby dictionary of the high likelihood pattern.

In step S146, the recognition processing unit 220 determines whether or not there is a target having a likelihood higher than a threshold value among targets detected using the nearby dictionary of the high likelihood pattern.

In a case where it is determined in step S146 that there is a target having a likelihood higher than the threshold value, the processing proceeds to step S147.

In step S147, the recognition processing unit 220 numbers the target having the likelihood higher than the threshold value, and associates the likelihood, the position information, and the TTC. Thereafter, the procedure returns to step S105 of FIG. 12, and the above-described processing is repeated.

As described above, the recognition processing of detecting a target having high likelihood existing near the vehicle 1 while widely detecting an object existing at a position far from the vehicle 1 is repeated.

According to the above processing, as the target approaches within a certain distance, the dictionaries used for the recognition processing are handed over to the far dictionaries of all patterns and the general-purpose nearby dictionary, the far dictionaries of all patterns and the nearby dictionary of the high likelihood pattern, and the general-purpose far dictionary and the nearby dictionary of the high likelihood pattern. As a result, the time required for the recognition processing is shortened, the processing frame rate can be increased, and the necessary memory can be reduced.

5. Modifications (Handover of a Plurality of Different Dictionaries)

In the example of the recognition processing described with reference to FIGS. 9 to 11, it is assumed that there is one dictionary in which the likelihood of the target exceeds the threshold value while the recognition processing using the far dictionaries of all patterns and the general-purpose nearby dictionary is repeated (dictionary A-3 of FIG. 10).

Figure 17:
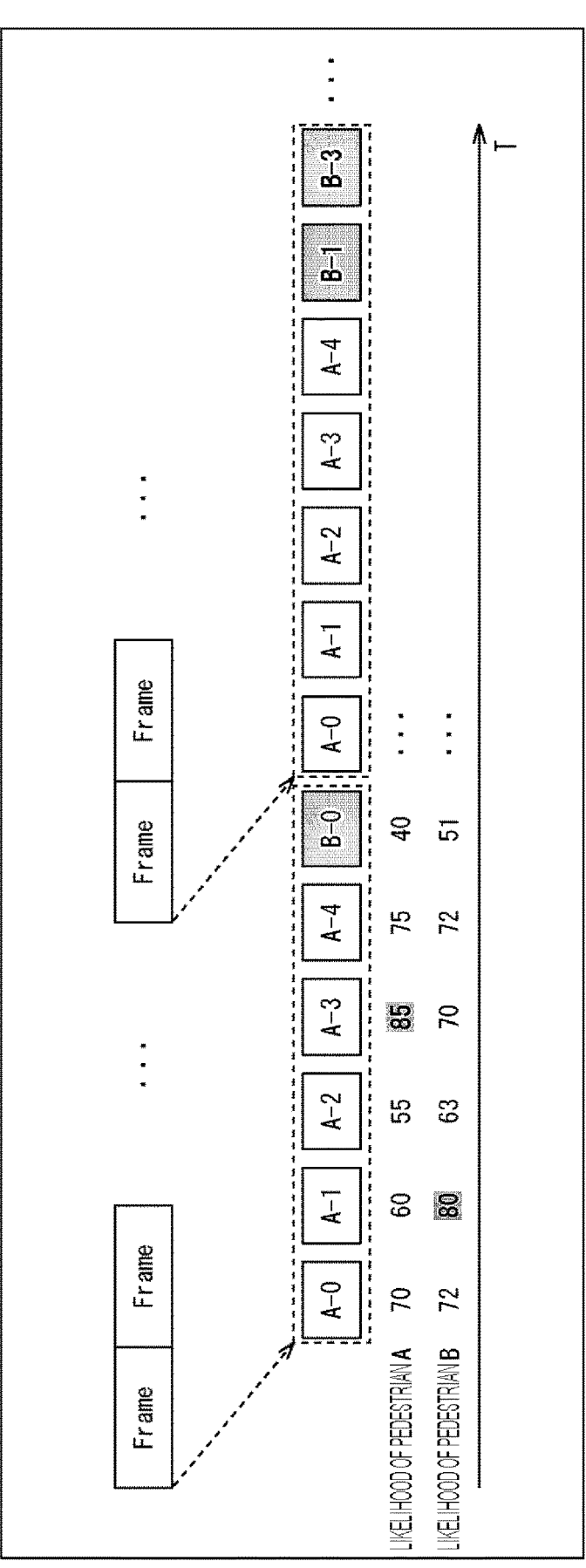
FIG. 17 is a diagram illustrating another example of recognition processing of the present technology using a recognition dictionary.

Not limited to this, there may be a case where the likelihood (85) of the pedestrian A by the recognition processing using the dictionary A-3 and the likelihood (80) of the pedestrian B by the recognition processing using the dictionary A-1 exceed the threshold value as illustrated in FIG. 17 while the recognition processing using the far dictionaries of all patterns and the general-purpose nearby dictionary is repeated.

In this case, the recognition processing using the far dictionaries (dictionaries A-0 to A-4) of all patterns and the nearby dictionaries (dictionary B-1 and B-3) of the same patterns as the dictionaries A-1 and A-3 of the high likelihood pattern is started for the latest frame at the time when the series of recognition processing is ended.

Figure 18:
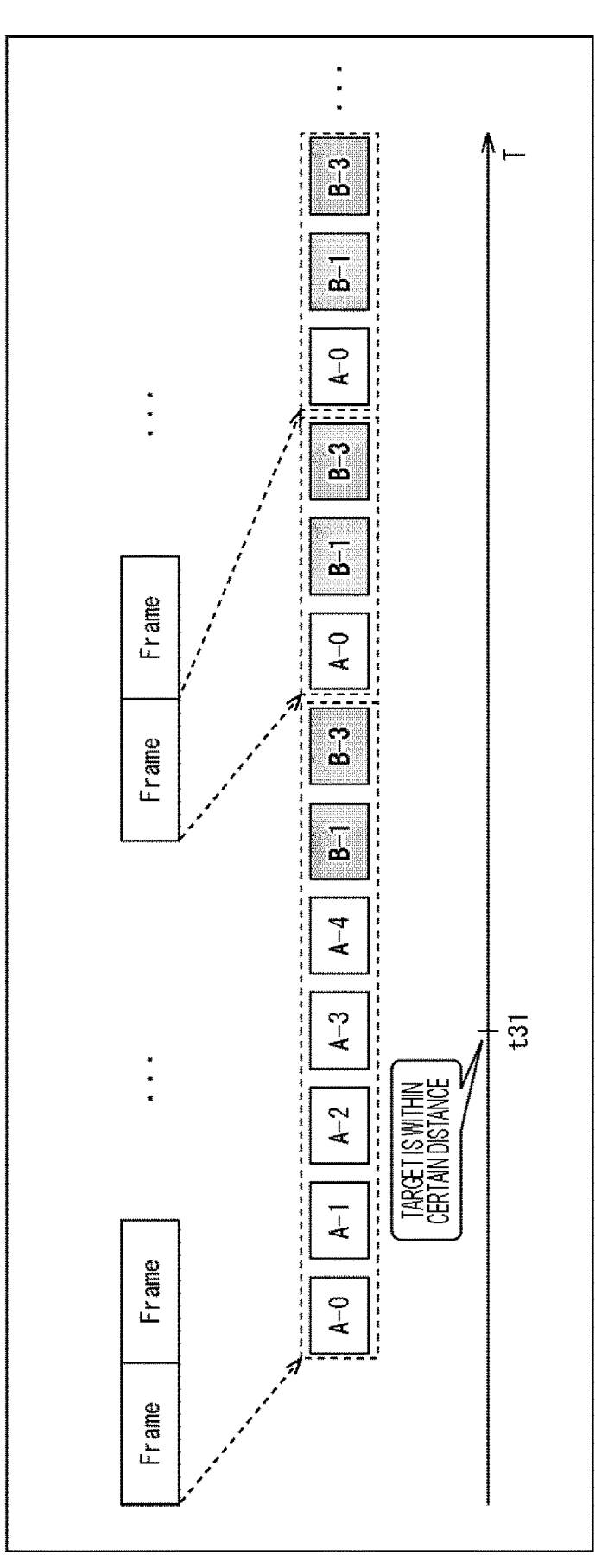
FIG. 18 is a diagram illustrating another example of recognition processing of the present technology using a recognition dictionary.

Thereafter, as illustrated in FIG. 18, it is assumed that the targets (pedestrian A and pedestrian B) detected with high likelihood approach the position within a certain distance from the vehicle 1 at timing t31 while the recognition processing using the far dictionaries of all patterns and the nearby dictionary of the high likelihood pattern is repeated.

In this case, the recognition processing using the far general-purpose dictionary (dictionary A-0) and the specialized nearby dictionaries (dictionary B-1 and dictionary B-3) of the high likelihood pattern is started for the latest frame at the time point when the series of recognition processing is ended.

As described above, in a case where dictionaries having a high likelihood are different in the recognition processing, each dictionary may be taken over.

(Application of Dictionary Data)

For the dictionary data (for example, the recognition dictionary of FIG. 7) stored in the nonvolatile memory unit 230, the average likelihood of each of the far dictionaries and the use frequency of the nearby dictionary may be recorded. In this case, on the basis of the recorded average likelihood or use frequency, a far dictionary having a low average likelihood or a nearby dictionary having a low use frequency is regarded as a dictionary having low recognition performance, and is periodically updated, whereby the recognition performance can be improved.

In addition, in the above-described example, as the dictionary data, a specialized far dictionary or a specialized nearby dictionary in which a target is learned for each specific pattern is prepared. Not limited to this, as illustrated in FIG. 19, a plurality of general-purpose far dictionaries (dictionaries A-0 to A-4) learned under different conditions and a plurality of general-purpose nearby dictionaries (dictionaries B-0 to B-4) learned under similar different conditions may be prepared. In the example of FIG. 19, it is possible to maintain the recognition performance by removing dictionaries having low recognition performance.

6. Configuration Example of Computer

A series of the processing described above can be executed by hardware or can be executed by software. In a case where the series of processing is executed by software, a program constituting the software is installed on a computer built into dedicated hardware or a general-purpose personal computer from a program recording medium, or the like.

Figure 20:
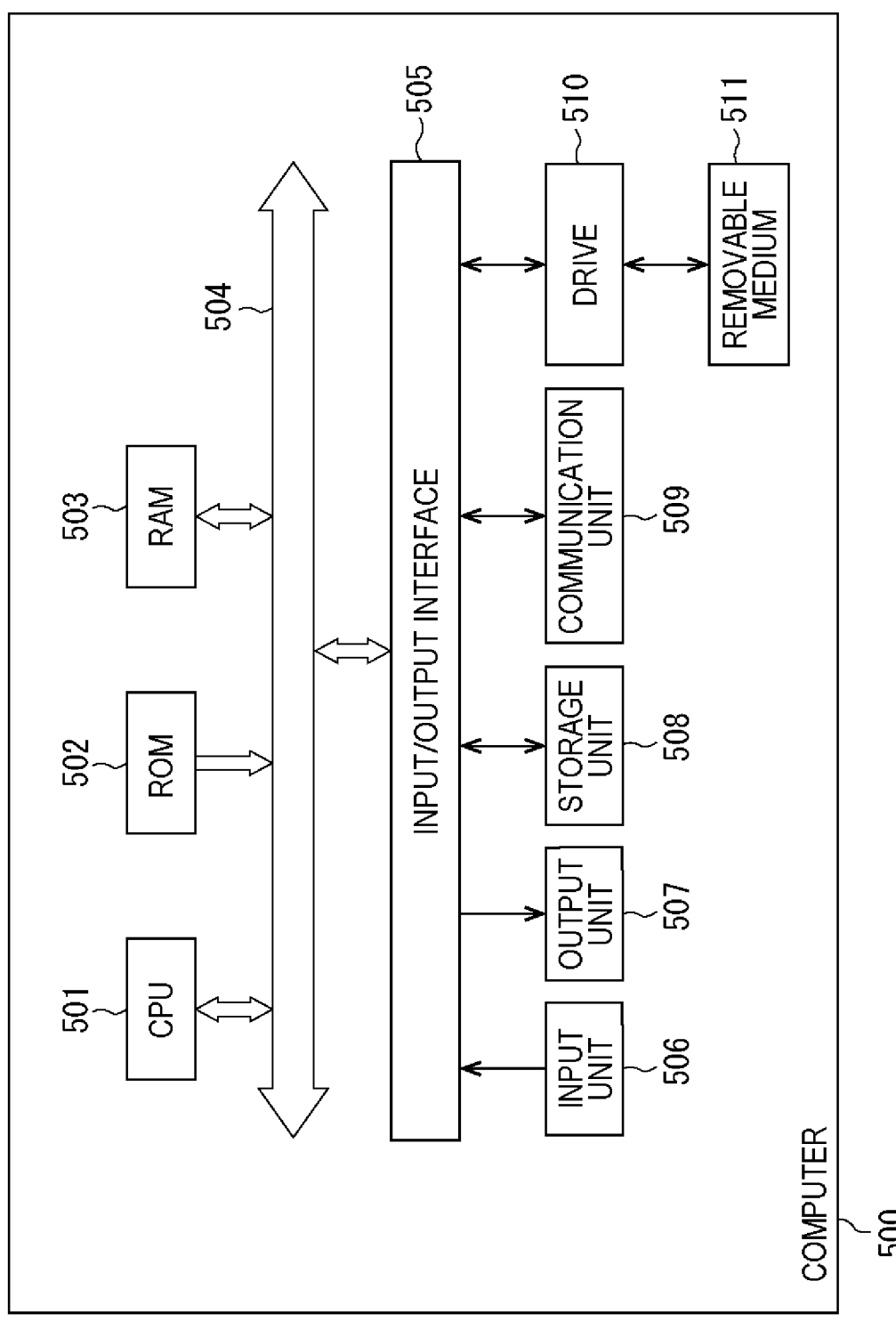
FIG. 20 is a block diagram illustrating a configuration example of a computer.

FIG. 20 is a block diagram illustrating a configuration example of hardware of a computer that executes the above-described series of processing by a program.

The recognition processing system 200 described above is realized by a computer 500 having the configuration illustrated in FIG. 20.

A CPU 501, a ROM 502, and a RAM 503 are connected to one another by a bus 504.

An input/output interface 505 is further connected to the bus 504. An input unit 506 including a keyboard, a mouse, and the like, and an output unit 507 including a display, a speaker, and the like are connected to the input/output interface 505. Furthermore, a storage unit 508 including a hard disk, a nonvolatile memory, and the like, a communication unit 509 including a network interface and the like, and a drive 510 that drives a removable medium 511 are connected to the input/output interface 505.

In the computer 500 configured as described above, for example, the CPU 501 loads a program stored in the storage unit 508 into the RAM 503 via the input/output interface 505 and the bus 504 and executes the program, whereby the above-described series of processing is performed.

For example, the program to be executed by the CPU 501 is stored in the removable medium 511, or provided via a wired or wireless transmission medium such as a local area network, the Internet, or digital broadcasting, and then installed in the storage unit 508.

Note that, the program to be executed by the computer 500 may be a program in which processing is performed in time series in the order described herein, or may be a program in which processing is performed in parallel or at necessary timing such as when a call is made, and the like.

In the present description, a system means an assembly of a plurality of components (such as devices and modules (parts)) and it does not matter whether or not all the components are in the same housing. Therefore, both of a plurality of apparatuses stored in different housings and connected via a network, and one apparatus in which a plurality of modules is stored in one housing are systems.

The embodiments of the present technology are not limited to the above-described embodiments, and various modifications can be made without departing from the gist of the present technology.

Furthermore, the effects described herein are merely examples and are not limited, and other effects may be provided.

Moreover, the present technology can have configurations as follows.

(1)

A recognition processing device including:

a dictionary data storage unit that stores a far dictionary for each pattern of a recognition target and a nearby dictionary for each pattern; and a recognition processing unit that executes recognition processing of recognizing an object included in a wide-angle image captured by a wide-angle camera by using the far dictionary and the nearby dictionary, in which the recognition processing unit recognizes the object by using a plurality of patterns of the far dictionaries and the nearby dictionary of the same pattern as the far dictionary of a high likelihood pattern in which the object is recognized with high likelihood among the far dictionaries.

(2)

The recognition processing device according to (1), in which the recognition processing unit repeats recognition of the object by using the plurality of patterns of the far dictionaries in a case where a distance to the recognized object is longer than a certain distance, and recognizes the object by using the nearby dictionary of the high likelihood pattern in a case where the distance to the recognized object is shorter than the certain distance.

(3)

The recognition processing device according to claim (1), in which the far dictionary and the nearby dictionary respectively include a specialized far dictionary and a specialized nearby dictionary specialized for object recognition of a specific pattern, and the recognition processing unit recognizes the object by using a plurality of patterns of the far dictionaries and the specialized nearby dictionary of the same pattern as the specialized far dictionary of the high likelihood pattern.

(4)

The recognition processing device according to (3), in which the far dictionary and the nearby dictionary each further include a general-purpose far dictionary and a general-purpose nearby dictionary for general-purpose object recognition, and the recognition processing unit recognizes the object by using the far dictionaries of all patterns including the general-purpose far dictionary and the general-purpose nearby dictionary, and then recognizes the object by using the specialized nearby dictionary of the high likelihood pattern instead of the general-purpose nearby dictionary.

(5)

The recognition processing device according to (4), in which, in a case where a distance to the recognized object is longer than a certain distance, the recognition processing unit repeats the recognition of the object by using the far dictionaries of all patterns and the specialized nearby dictionary of the high likelihood pattern.

(6)

The recognition processing device according to (5), in which, in a case where the distance to the recognized object is shorter than a certain distance, the recognition processing unit recognizes the object using the general-purpose far dictionary and the specialized nearby dictionary of the high likelihood pattern.

(7)

The recognition processing device according to any one of (1) to (6), in which the recognition processing unit recognizes the object by using only the nearby dictionaries of a plurality of patterns at a start of the recognition processing.

(8)

The recognition processing device according to any one of (1) to (7), in which the recognition processing unit sets the far dictionary in which the object having the smallest time to collision (TTC) among the objects recognized with the high likelihood using the far dictionary is recognized as the far dictionary of the high likelihood pattern.

(9)

The recognition processing device according to any one of (1) to (8), in which the recognition processing unit executes a series of recognition processing using the far dictionary and the nearby dictionary for one frame of the wide-angle image acquired at a predetermined timing.

(10)

The recognition processing device according to any one of (1) to (9), in which the recognition processing unit recognizes the object included in the cylindrically corrected wide-angle image.

(11)

The recognition processing device according to any one of (1) to (10), in which the wide-angle camera includes an in-vehicle camera mounted on a vehicle.

(12)

The recognition processing device according to (11), in which the wide-angle camera captures the wide-angle image with a rear of the vehicle as an imaging range.

(13)

The recognition processing device according to (12), in which the recognition processing unit recognizes a pedestrian existing around the vehicle as the object included in the wide-angle image.

(14)

A recognition processing method, including recognizing, by a recognition processing device that executes recognition processing of recognizing an object included in a wide-angle image captured by a wide-angle camera using a far dictionary for each pattern to be recognized and a nearby dictionary for each pattern, the object by using the far dictionaries of a plurality of patterns and the nearby dictionary of the same pattern as the far dictionary of a high likelihood pattern in which the object is recognized with high likelihood among the far dictionaries.

(15)

A recognition processing system including:

a wide-angle camera; and a recognition processing device that stores a far dictionary for each pattern to be recognized and a nearby dictionary for each pattern, and executes recognition processing of recognizing an object included in a wide-angle image captured by the wide-angle camera using the far dictionary and the nearby dictionary, in which the recognition processing device recognizes the object by using a plurality of patterns of the far dictionaries and the nearby dictionary of the same pattern as the far dictionary of a high likelihood pattern in which the object is recognized with high likelihood among the far dictionaries.

REFERENCE SIGNS LIST

1 Vehicle
11 Vehicle control system
51 Camera
73 Recognition processing unit
200 Recognition processing system
210 Imaging unit
220 Recognition processing unit
221 Image input unit
222 Image processing unit
223 Detection processing unit
224 Volatile memory unit
225 Control unit
230 Nonvolatile memory unit
231 Dictionary data

The invention claimed is:

1. A recognition processing device, comprising:
a dictionary data storage unit that stores a far dictionary for each pattern of a recognition target and a nearby dictionary for each pattern; and
a recognition processing unit that executes recognition processing of recognizing an object included in a wide-angle image captured by a wide-angle camera by using the far dictionary and the nearby dictionary, wherein
the recognition processing unit recognizes the object by using a plurality of patterns of far dictionaries and the nearby dictionary of the same pattern as the far dictionary of a high likelihood pattern in which the object is recognized with high likelihood among the far dictionaries.

2. The recognition processing device according to claim 1, wherein the recognition processing unit repeats recognition of the object by using the plurality of patterns of the far dictionaries in a case where a distance to the recognized object is longer than a certain distance, and recognizes the object by using the nearby dictionary of the high likelihood pattern in a case where the distance to the recognized object is shorter than the certain distance.

3. The recognition processing device according to claim 1, wherein
the far dictionary and the nearby dictionary respectively include a specialized far dictionary and a specialized nearby dictionary specialized for object recognition of a specific pattern, and
the recognition processing unit recognizes the object by using a plurality of patterns of the far dictionaries and the specialized nearby dictionary of the same pattern as the specialized far dictionary of the high likelihood pattern.

4. The recognition processing device according to claim 3, wherein the far dictionary and the nearby dictionary each further include a general-purpose far dictionary and a general-purpose nearby dictionary for general-purpose object recognition, and the recognition processing unit recognizes the object by using the far dictionaries of all patterns including the general-purpose far dictionary and the general-purpose nearby dictionary, and then recognizes the object by using the specialized nearby dictionary of the high likelihood pattern instead of the general-purpose nearby dictionary.

5. The recognition processing device according to claim 4, wherein, in a case where a distance to the recognized object is longer than a certain distance, the recognition processing unit repeats the recognition of the object by using the far dictionaries of all patterns and the specialized nearby dictionary of the high likelihood pattern.

6. The recognition processing device according to claim 5, wherein, in a case where the distance to the recognized object is shorter than a certain distance, the recognition processing unit recognizes the object using the general-purpose far dictionary and the specialized nearby dictionary of the high likelihood pattern.

7. The recognition processing device according to claim 1, wherein the recognition processing unit recognizes the object by using only nearby dictionaries of a plurality of patterns at a start of the recognition processing.

8. The recognition processing device according to claim 1, wherein the recognition processing unit sets the far dictionary in which the object having a smallest time to collision (TTC) among the objects recognized with the high likelihood using the far dictionary is recognized as the far dictionary of the high likelihood pattern.

9. The recognition processing device according to claim 1, wherein the recognition processing unit executes a series of recognition processing using the far dictionary and the nearby dictionary for one frame of the wide-angle image acquired at a predetermined timing.

10. The recognition processing device according to claim 1, wherein the recognition processing unit recognizes the object included in the cylindrically corrected wide-angle image.

11. The recognition processing device according to claim 1, wherein the wide-angle camera includes an in-vehicle camera mounted on a vehicle.

12. The recognition processing device according to claim 11, wherein the wide-angle camera captures the wide-angle image with a rear of the vehicle as an imaging range.

13. The recognition processing device according to claim 12, wherein the recognition processing unit recognizes a pedestrian existing around the vehicle as the object included in the wide-angle image.

14. A recognition processing method, comprising:

recognizing, by a recognition processing device that executes recognition processing of recognizing an object included in a wide-angle image captured by a wide- angle camera using a far dictionary for each pattern to be recognized and a nearby dictionary for each pattern, the object by using far dictionaries of a plurality of patterns and the nearby dictionary of the same pattern as the far dictionary of a high likelihood pattern in which the object is recognized with high likelihood among the far dictionaries.

15. A recognition processing system, comprising:

a wide-angle camera; and a recognition processing device that stores a far dictionary for each pattern to be recognized and a nearby dictionary for each pattern, and executes recognition processing of recognizing an object included in a wide-angle image captured by the wide-angle camera using the far dictionary and the nearby dictionary, wherein the recognition processing device recognizes the object by using a plurality of patterns of far dictionaries and the nearby dictionary of the same pattern as the far dictionary of a high likelihood pattern in which the object is recognized with high likelihood among the far dictionaries.

* * * * *